(12) United States Patent
Takahashi

(10) Patent No.: US 8,978,080 B2
(45) Date of Patent: Mar. 10, 2015

(54) DISPLAY DEVICE, TRANSMITTING TERMINAL, RECEIVING TERMINAL AND WIRELESS COMMUNICATION SYSTEM

(71) Applicant: Olympus Corporation, Tokyo (JP)

(72) Inventor: Tetsuyuki Takahashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 134 days.

(21) Appl. No.: 13/869,598

(22) Filed: Apr. 24, 2013

(65) Prior Publication Data

US 2013/0235246 A1 Sep. 12, 2013

Related U.S. Application Data

(63) Continuation of application No. PCT/JP2011/066701, filed on Jul. 22, 2011.

(30) Foreign Application Priority Data

Nov. 2, 2010 (JP) .................................. 2010-246615

(51) Int. Cl.
*H04N 7/00* (2011.01)
*H04N 7/18* (2006.01)
*H04N 21/4363* (2011.01)
*H04N 5/232* (2006.01)

(52) U.S. Cl.
CPC ......... *H04N 7/181* (2013.01); *H04N 21/43637* (2013.01); *H04N 5/23206* (2013.01)

USPC .......................................................... 725/105

(58) Field of Classification Search
USPC ..................................... 725/105; 348/333.01
See application file for complete search history.

(56) References Cited

U.S. PATENT DOCUMENTS 4,992,866 A 2/1991 Morgan

FOREIGN PATENT DOCUMENTS

| EP | 2 061 247 A1 | 5/2009 |
|---|---|---|
| JP | 2001-197150 A | 7/2001 |
| JP | 2001-345817 A | 12/2001 |
| JP | 2006-309583 A | 11/2006 |

OTHER PUBLICATIONS

European Search Report dated Jul. 30, 2013, issued in corresponding European Patent Application No. 11837789.4.
International Search Report of PCT/JP2011/066701, mailing date of Sep. 13, 2011.

*Primary Examiner* — Gary C Vieaux
(74) *Attorney, Agent, or Firm* — Westerman, Hattori, Daniels & Adrian, LLP

(57) ABSTRACT

A display device may include: an acquisition unit acquiring transmitting terminal identification information that is identification information of a transmitting terminal transmitting image data by wireless communication, and receiving terminal identification information that is identification information of a receiving terminal receiving the image data by wireless communication; and an information display unit displaying the transmitting terminal identification information and the receiving terminal identification information.

6 Claims, 14 Drawing Sheets

FIG. 4

| ID NUMBER | DEVICE IDENTIFICATION INFORMATION | POWER SUPPLY STATUS | |
|---|---|---|---|
| 0001 | C1 | ON | } 101 |
| 0002 | D1 | OFF | } 102 |
| 0003 | C2 | OFF | } 103 |
| 0004 | D2 | OFF | } 104 |

FIG. 5

| TRANSMITTING DEVICE IDENTIFICATION INFORMATION | RECEIVING DEVICE IDENTIFICATION INFORMATION | |
|---|---|---|
| C1 | D1 | } 201 |
| C2 | D2 | } 202 |

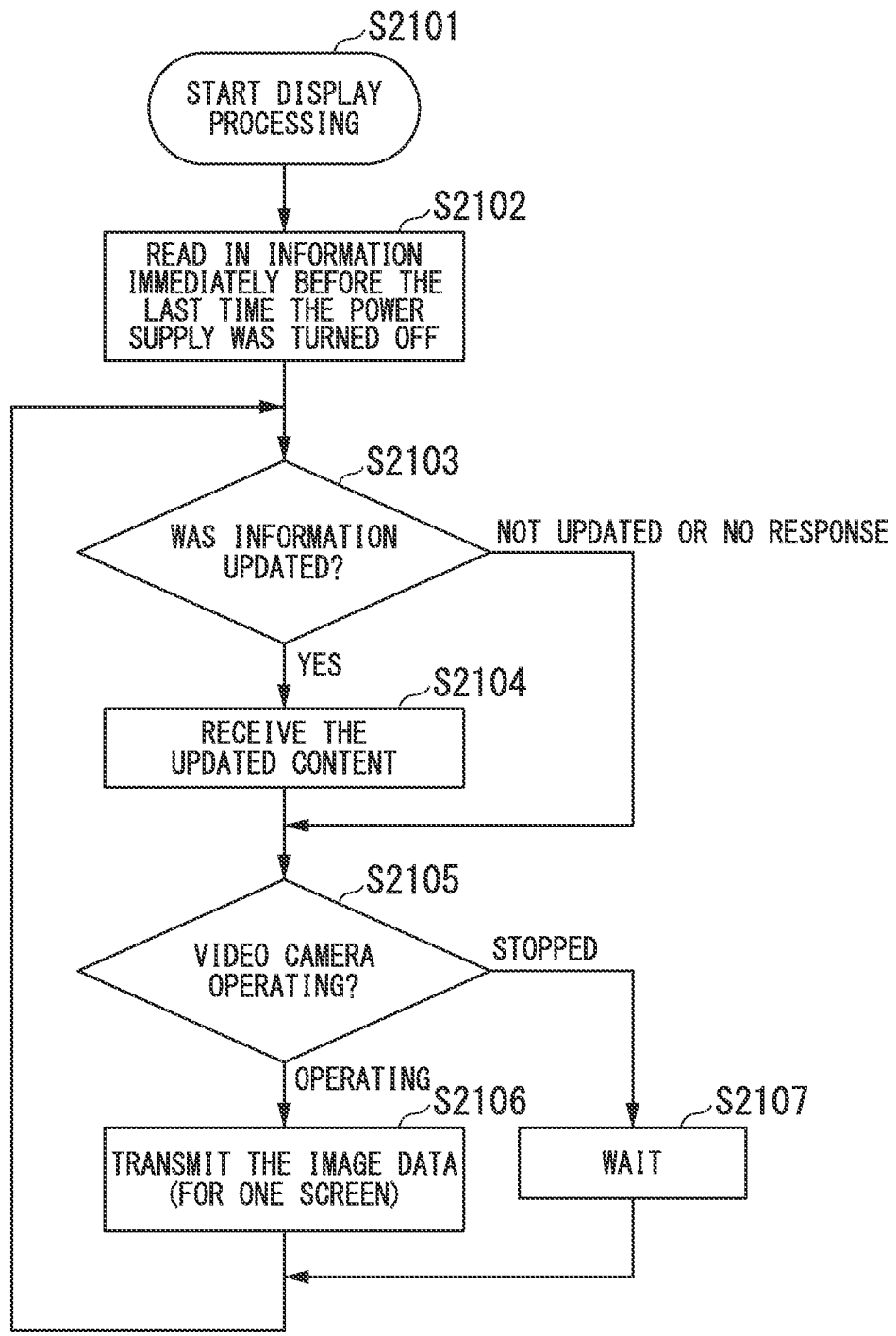

DISPLAY DEVICE, TRANSMITTING TERMINAL, RECEIVING TERMINAL AND WIRELESS COMMUNICATION SYSTEM

CROSS REFERENCE TO RELATED APPLICATIONS

This application is a continuation application based on a PCT Patent Application No. PCT/JP2011/066701, filed Jul. 22, 2011, whose priority is claimed on Japanese Patent Application No. 2010-246615, filed on Nov. 2, 2010, the entire content of which are hereby incorporated by reference.

BACKGROUND OF THE INVENTION

1. Field of the Invention

The present invention relates to a display device, a transmitting terminal, a receiving terminal, and a wireless communication system.

2. Description of the Related Art

Conventional art is known in which, in a display means of an apparatus that communicates wirelessly, a list is displayed of identification information of other apparatuses capable of communicating with the local apparatus (refer to, for example, Japanese Unexamined Patent Application, First Publication No. 2001-197150). Also, a wireless communication system used in an operating room or the like is known, which is constituted by a plurality of imaging apparatuses and a plurality of display apparatuses, and in which switching is done, as necessary, of the combination of the wireless communication between the imaging apparatuses and the display apparatuses.

SUMMARY

The present invention provides a display device, a transmitting terminal, a receiving terminal, and a wireless communication system that facilitates an understanding of the wireless communication connection relationship.

According to a first aspect of the present invention, a display device may include: an acquisition unit acquiring transmitting terminal identification information that is identification information of a transmitting terminal transmitting image data by wireless communication, and receiving terminal identification information that is identification information of a receiving terminal receiving the image data by wireless communication; and an information display unit displaying the transmitting terminal identification information and the receiving terminal identification information.

According to a second aspect of the present invention, in the display device according to the first aspect, the information display unit may further display information indicating that the image data is transmitted from the transmitting terminal to the receiving terminal.

According to a third aspect of the present invention, the display device according to claim 1 may further include: a connection unit that connects the transmitting terminal or the receiving terminal in order to transmit or receive information.

According to a fourth aspect of the present invention, the transmitting terminal may include: the display device according to the first aspect.

According to a fifth aspect of the present invention, the receiving terminal may include: the display device according to the first aspect.

According to a sixth aspect of the present invention, in the receiving device according to the fifth aspect may include: an image data display unit that displays the image data.

According to a seventh aspect of the present invention, a wireless communication system having a plurality of communication devices that wirelessly communicates image data may include: a plurality of identification information display devices that visually display the identification information established for each individual communication device; and a communication status display device that displays a flow of the image data between the communication devices. The identification information may be uniquely established at the time the communication devices join the network.

According to an eighth aspect of the present invention, in the wireless communication system according to the seventh aspect, the identification information display devices may be connected to or mounted in a one-to-one relationship on the communication devices.

According to a ninth aspect of the present invention, the wireless communication system according to the seventh aspect or the eighth aspect may further include: a connection switching device that displays the identification information and the flow of the image data between the communication devices on the same screen, and that also controls switching of the flow of the image data according to an instruction.

According to a tenth aspect of the present invention, a wireless communication system, in which a terminal that wirelessly transmits image data is referred to as a transmitting terminal, a terminal that wirelessly receives image data is referred to as a receiving terminal, and a device that instructs to switch a wireless communication connection between the transmitting terminal and the receiving terminal is referred to as a connection switching device, the wireless communication system having a plurality of the transmitting terminals, a plurality of the receiving terminals, and at least one of the connection switching device, may include: a first display device connected by cable to the transmitting terminal to display transmitting terminal identification information that is identification information of the transmitting terminal; and a second display device connected by cable to the receiving terminal to display receiving terminal identification information that is identification information of the receiving terminal. The connection switching device may display the transmitting terminal identification information displayed on the first display device, the receiving terminal identification information displayed on the second display device, and information indicating that the image data is wirelessly transmitted from the transmitting terminal to the receiving terminal.

According to an eleventh aspect of the present invention, in the wireless communication system according to the tenth aspect, the connection switching device may wirelessly receive the transmitting terminal identification information from the transmitting terminal and the receiving terminal identification information from the receiving terminal, respectively.

According to a twelfth aspect of the present invention, the wireless communication system according to the tenth aspect may further include: a third display device that is connected by cable to the receiving terminal to display information indicating that the transmitting terminal identification information and the image data are wirelessly transmitted from the transmitting terminal corresponding to the transmitting terminal identification information.

According to a thirteenth aspect of the present invention, the wireless communication system according to the tenth aspect or the twelfth aspect may further include: a fourth display device that is connected by cable to the transmitting terminal to display information indicating that the receiving terminal identification information and the image data are wirelessly transmitted to the receiving terminal corresponding to the receiving terminal identification information.

According to a fourteenth aspect of the present invention, in the wireless communication system according to the tenth aspect, the receiving terminal may have an image data display unit that displays the image data.

BRIEF DESCRIPTION OF THE DRAWINGS

FIG. 4 is a simplified table illustrating the data structure of the identification information control table in accordance with the first preferred embodiment of the present invention;

FIG. 5 is a simplified table illustrating the data structure of the communication status information control table in accordance with the first preferred embodiment of the present invention;

FIG. 16 is a flowchart illustrating the processing protocol of the displays in accordance with the second preferred embodiment of the present invention.

DESCRIPTION OF THE PREFERRED EMBODIMENTS

First Preferred Embodiment

Figure 1:
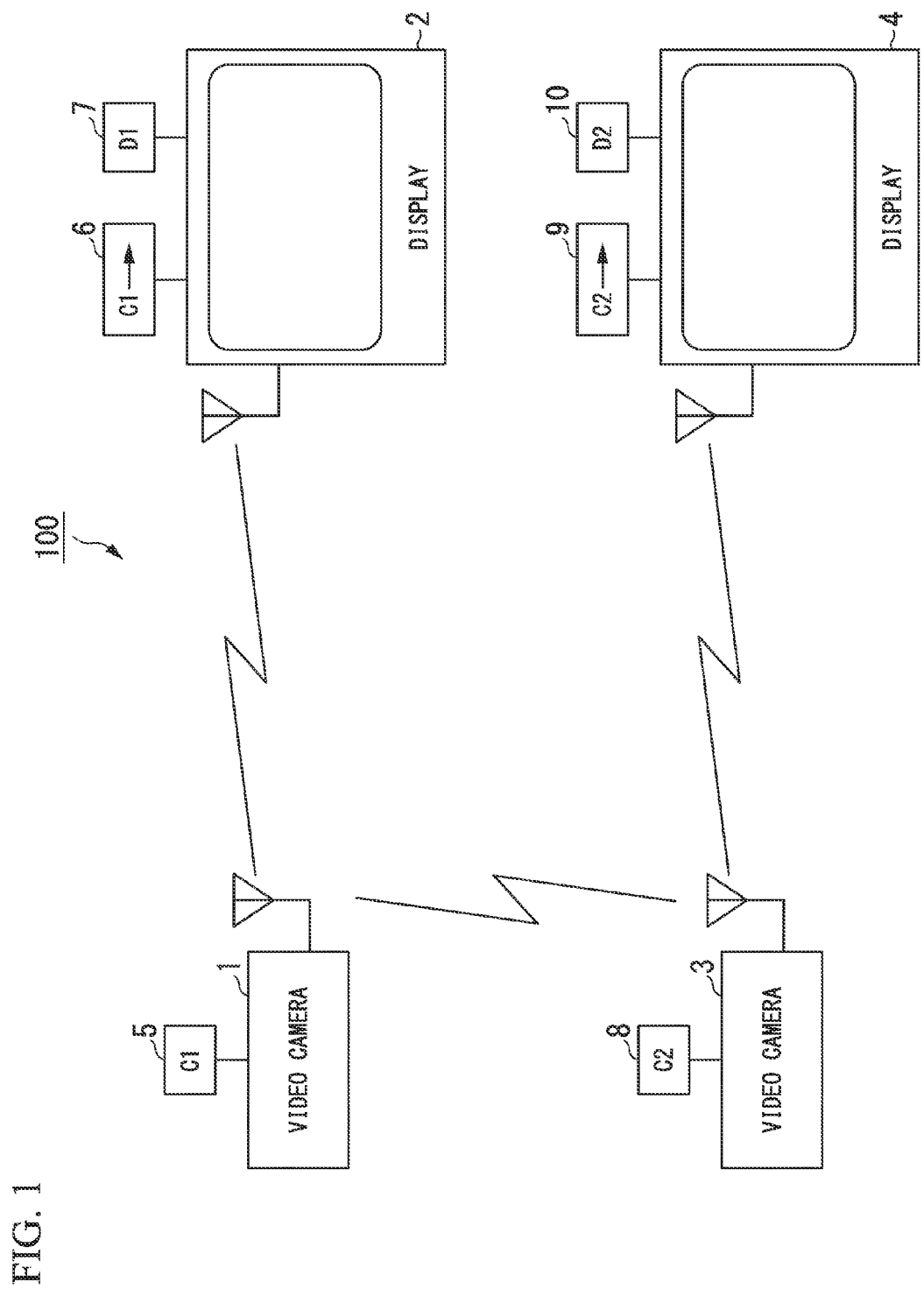
FIG. 1 is a simplified drawing illustrating the constitution of a wireless communication system in accordance with the first preferred embodiment of the present invention.

A first preferred embodiment of the present invention will be described below, with references made to the drawings. FIG. 1 is a simplified drawing illustrating the constitution of a wireless communication system in accordance with the first preferred embodiment of the present invention. In the illustrated example, a wireless communication system 100 is constituted by two video cameras 1 and 3 that have the function of wirelessly transmitting captured image data, and two displays 2 and 4 that receive and display the image data transmitted from the video cameras 1 and 3. In the first preferred embodiment, the displays 2 and 4 are pre-established as the transmission destinations of image data by the video cameras 1 and 3. In the illustrated example, the video camera 1 has the display 2 as its transmitting destination of image data, and the video camera 3 has the display 4 as its transmitting destination of image data. As a result, the display 2 displays the image captured by the video camera 1, and the display 4 displays the image captured by the video camera 3.

An identification information display device 5 that displays the device identification information of the local device is mounted on the video camera 1. The device identification information is information that uniquely identifies of each device. The device identification information is determined by the video cameras 1 and 3 that are in the "parent" status, which will be described later. The method for establishing the device identification information will be described later. In the illustrated example, because the device identification information of the video camera 1 is C1, the device information display device 5 displays C1. An identification information display device 8 is mounted on the video camera 3. In the illustrated example, because the device identification information of the video camera 3 is C2, the identification information display device 8 displays C2.

A communication status display device 6 and an identification information display device 7 that display device identification information of communication destination device and communication status information including the communication status with the communication destination device are mounted on the display 2. In the illustrated example, the communication destination device of the display 2 is the video camera 1 and, because the display 2 and the video camera 1 are communicating, the communication status display device 6 displays C1, which is the device identification information of the communication destination video camera 1, and a right-direction arrow, which is information indicating that communication with the communication destination video camera 1 is in progress. Because the device identification information of the display 2 is D1, the identification information display device 7 displays D1.

A communication status display device 9 and an identification information display device 10 are mounted on the display 4. In the illustrated example, the communication destination of the display 4 is the video camera 3 and, because the display 4 and the video camera 3 are communicating, the communication status display device 9 displays the device identification information C2 of the communication destination video camera 3, and a right-direction arrow, which is information indicating that communication with the communication destination camera 3 is in progress. Because the device identification information of the display 4 is D2, the identification information display device 7 displays D2. The device identification information of the destination device and the information indicating that communication with the communication destination device is in progress, which are displayed on the communication status display devices 6 and 9, are collectively taken to be the communication status information.

As described above, because the identification information display devices 5, 7, 8, and 10 display device identification information that uniquely identifies the local devices, and the communication status display devices 6 and 9 display the device identification information of the communication destination devices of the displays 2 and 4 and communication status information indicating the communication status with the communication destination device, a user can easily verify in a visual manner the combinations of video cameras 1 and 3 and the displays 2 and 4, which perform communication.

Also, in the illustrated example, although the video cameras 1 and 3 do not have the communication status display devices 6 and 9, the video cameras 1 and 3 may be provided with the communication status display devices 6 and 9, so that they display the device identification information of the communication destination device and the status of communication with the communication destination device.

Also, for example, a combination of the communication status display devices 6 and 9 and the identification information display devices 7 and 10 corresponds to the display device of the present invention. For example, the communication status display devices 6 and 9 correspond to the identification information display device and the communication status display device of the present invention.

Figure 2:
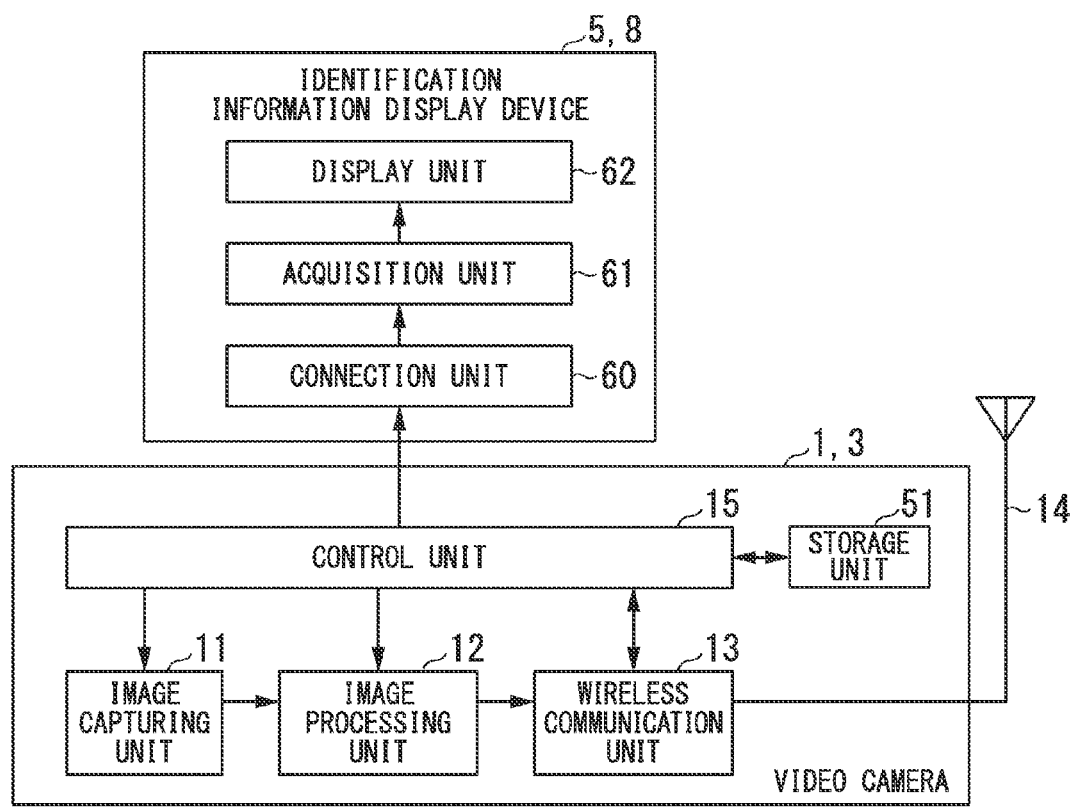
FIG. 2 is a block diagram indicating the constitution of the video cameras and the identification information display devices in accordance with the first preferred embodiment of the present invention.

Next, the constitution of the video cameras 1 and 3 and the identification information display devices 5 and 8 will be described. FIG. 2 is a block diagram indicating the constitution of the video cameras 1 and 3 and the identification information display devices 5 and 8 in accordance with the first preferred embodiment of the present invention. In the illustrated example, the video cameras 1 and 3 have an imaging unit 11, an image processing unit 12, a wireless communication unit 13, an antenna 14, a control unit 15, and a storage unit 51. The identification information display devices 5 and 8 are mounted on the video cameras 1 and 3. The identification information display devices 5 and 8 have a connection unit 60, an acquisition unit 61, and a display unit 62.

The imaging unit 11 has an optical system, an image sensor (for example, a CCD (charge-coupled device) or CMOS (complementary metal oxide semiconductor) sensor), and an A/D converter. The imaging unit 11 captures a photographed object, and converts the optical image of the photographed object to a digital signal. The image processing unit 12 generates image data from the digital signal converted by the imaging unit 11, and performs image processing of the generated image data. The wireless communication unit 13 performs high-frequency processing of the image data that is image processed by the image processing unit 12, and information to be transmitted to another device, such as device identification information and communication status information, which will be described later, and transmits these wirelessly via the antenna 14. The wireless communication unit 13 also receives, via the antenna 14, information that is wirelessly transmitted from another device. The storage unit 51 stores information required for the processing in various parts of the video cameras 1 and 3.

The control unit 15, by controlling the various parts of the video cameras 1 and 3, controls the operation of data transmission. The control unit 15 also, by controlling the various parts of the video cameras 1 and 3, as necessary, performs display information creation operation or display information receiving operation. The display information creation operation is the operation of creating device identification information to be displayed on the identification information display devices 5, 7, 8 and 10 included in the communication system 100 and communication status information to be displayed on the communication status display devices 6 and 9, and transmitting the generated communication status information to another device. The details of the display information creation operation will be described later. The display information receiving operation is the operation of receiving device identification information and communication status information transmitted from a device that performs a display information creation operation.

In the first preferred embodiment, of the video cameras 1 and 3 included in the communication system 100, only the video camera 1, 3 first starting operation performs the display information creation operation, the remaining video camera 1, 3 and the display 2, 4 performing the display information receiving operation. A device that performs the display information creation operation will be called a "parent device," and the status of becoming a parent device will be referred as the parent status. Also, a device that performs the display information receiving operation will be called a "child device," and the status of becoming a child device will be referred to as the child status.

The connection unit 60 is connected to the video cameras 1 and 3 by cable in order to perform communication. The acquisition unit 61, using by serial communication by the cable connected to the video cameras 1 and 3 via the connection unit 60, acquires device identification information from the control units 15 of the video cameras 1 and 3. The display unit 62 displays the device identification information acquired by the acquisition unit 61. By this constitution, the identification information display devices 5 and 8 can display the device identification information of the video cameras 1 and 3. Because the method for displaying the information by this constitution is publicly known, the description thereof will be omitted.

Although the identification information display devices 5 and 8 shown in FIG. 2 are constituted as being separate from the video cameras 1 and 3, they may be integrated as a part of the video cameras 1 and 3. In this case as well, communication between the control units 15 of the video cameras 1 and 3 and the identification information display devices 5 and 8 is performed by cable serial communication.

Figure 3:
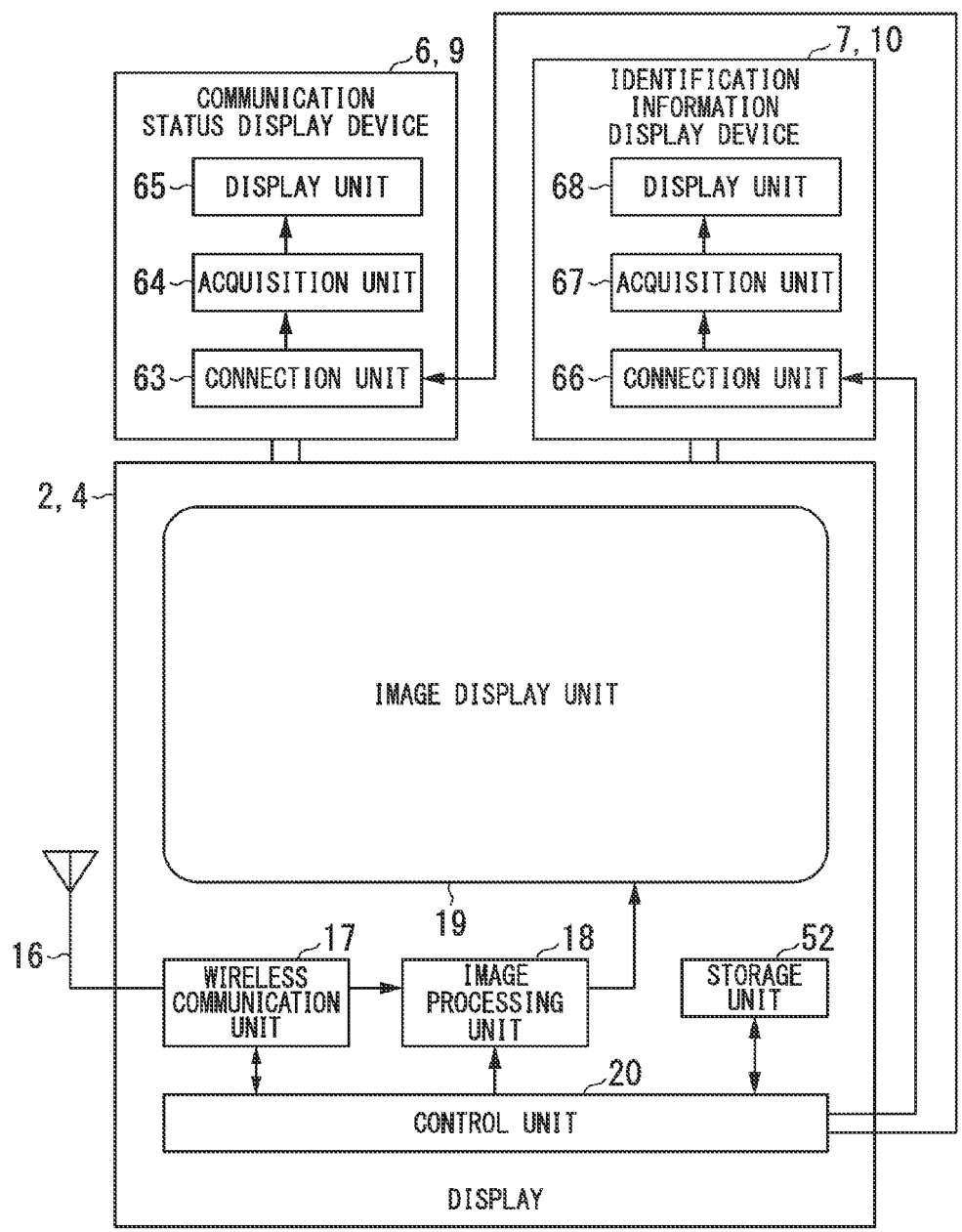
FIG. 3 is a block diagram illustrating the constitution of the displays, the communication status display devices, and the identification information display devices in accordance with the first preferred embodiment of the present invention.

Next, the constitution of the displays 2 and 4 will be described. FIG. 3 is a block diagram illustrating the constitution of the displays 2 and 4, the communication status display devices 6 and 9, and the identification information display devices 7 and 10 in accordance with the first preferred embodiment of the present invention. In the illustrated example, the displays 2 and 4 have an antenna 16, a wireless communication unit 17, an image processing unit 18, an image display unit 19 (image data display unit), a control unit 20, and a storage unit 52. The communication status display devices 6 and 9 and the identification information display devices 7 and 10 are mounted on the displays 2 and 4. The communication status display devices 6 and 9 have a connection unit 63, an acquisition unit 64, and a display unit 65 (information display unit). The identification information display devices 7 and 10 have a connection unit 66, an acquisition unit 67, and a display unit 68 (information display unit).

The wireless communication unit 17 receives, via the antenna 16, the image data, the device identification information, and the communication status information, which are wirelessly transmitted. The image processing unit 18 performs image processing of image data in order to display on the image display unit 19 an image based on the image data received by the wireless communication unit 17. The image display unit 19 displays an image based on the image data that has been image-processed by the image processing unit 18. The control unit 20, by controlling the various parts of the displays 2 and 4, performs control of the image data receiving operation, of the display information receiving operation, which is the operation of receiving device identification information and communication status information, and of the display operation based on the received data. The storage unit 52 stores information necessary for processing in the various parts of the displays 2 and 4.

The connection unit 63 is connected to the displays 2 and 4 by cable in order to perform communication. The acquisition unit 64, using serial communication by the cable connected to the displays 2 and 4 via the connection unit 63, acquires communication status information from the control units 20 of the displays 2 and 4. The display unit 65 displays the communication status information acquired by the acquisition unit 64. By this constitution, the communication status display devices 6 and 9 can display the communication status information of the displays 2 and 4. Because the method for displaying the information by this constitution is publicly known, the description thereof will be omitted.

The connection unit 66 is connected to the displays 2 and 4 by cable in order to perform communication. The acquisition unit 67, using serial communication by the cable connected to the displays 2 and 4 via the connection unit 66, acquires device identification information from the control units 20 of the displays 2 and 4. The display unit 68 displays the device identification information acquired by the acquisition unit 67. By this constitution, the identification information display devices 7 and 10 can display the device identification information of the displays 2 and 4. Because the method for displays the information by this constitution is publicly known, the description thereof will be omitted.

Although the communication status display devices 6 and 9 and the identification information display devices 7 and 10 are constituted as being separate from the displays 2 and 4, they may be integrated as a part of the displays 2 and 4. In this case as well, communication between the control units 20 of the displays 2 and 4, the communication status display devices 6 and 9, and the identification information display devices 7 and 10 is performed by cable serial communication.

Next, the identification information control table that is stored by the storage units 51 of the video cameras 1 and 3 that are in the parent status in the first preferred embodiment will be described. FIG. 4 is a simplified table illustrating the data structure of the identification information control table in accordance with the first preferred embodiment of the present invention. The identification information control table includes data items for ID numbers, device identification information, and power supply status, and the data of each of the data items are stored in association with one another for each line.

The data item ID number stores the ID numbers of devices included in the communication system 100. The ID numbers are uniquely assigned to each device beforehand. In the first preferred embodiment, the ID number of the video camera 1 is 0001, the ID number of the video camera 3 is 0003, the ID number of the display 2 is 0002, and the ID number of the display 4 is 0004.

The data item device identification information stores device identification information that is established for the device identified by the ID number stored on the same line. The data item power supply status stores whether the power supply of the device that is identified by the ID number stored on the same line is on or off.

In the illustrated example, on line 101 the value stored in the data item ID number is 0001, the value stored in the data item device identification information is C1, and the value stored in the data item power supply status is on. This indicates that the identification information of the device identified by the ID number 0001 is C1 and that the power supply of the device uniquely identified by the device identification information C1 is on (on status). The other lines are as illustrated.

Next, the communication status information control table stored by the storage units 51 of the video cameras 1 and 3 that have gone into the parent status in the first preferred embodiment will be described. FIG. 5 is a simplified table illustrating the data structure of the communication status information control table in accordance with the first preferred embodiment of the present invention. The communication status information control table includes data items for transmitting device identification information, and receiving device identification information, the data of each of the data items being stored in association with one another for each line.

The data item transmitting device identification information stores device identification information of a device transmitting image data to a device that is uniquely identified by the receiving device identification information stored in the same line. The data item receiving device identification information stores the device identification information of a device receiving image data from a device that is uniquely identified by the transmitting device identification information stored in the same line.

In the illustrated example, in line 201, the value stored in the data item transmitting device identification information is C1, and the value stored in the data item receiving device identification information is D1. This indicates that the device that is the image data transmitting destination for the device uniquely identified by the device identification information C1 is the device uniquely identified by the device identification information D1. The other lines are as illustrated.

Figure 6:
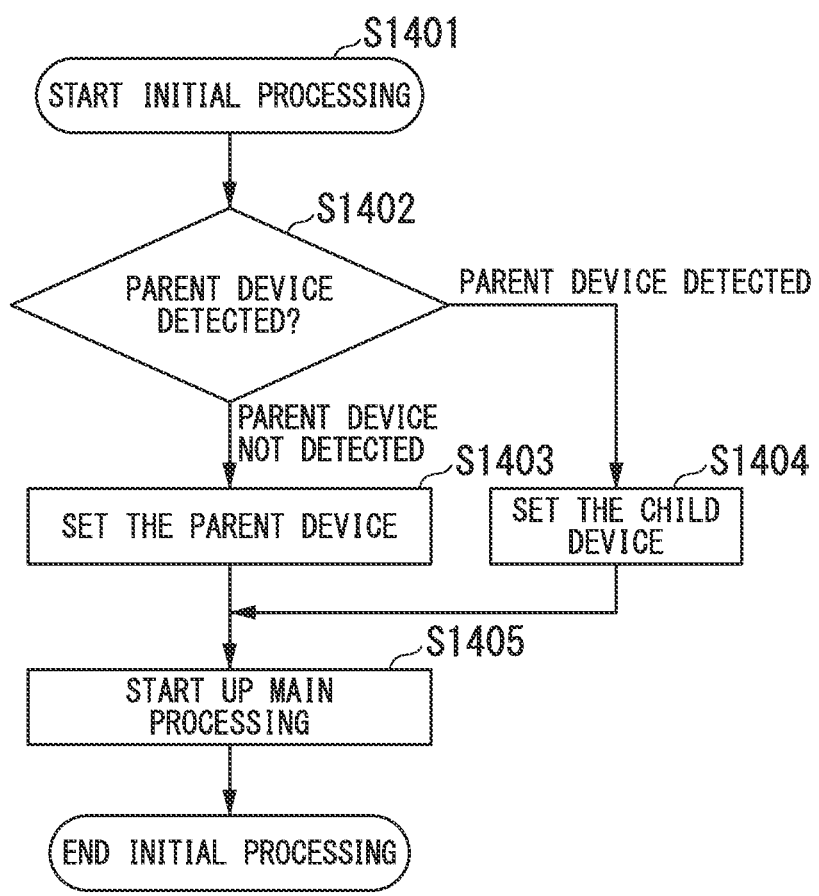
FIG. 6 is a flowchart illustrating the processing protocol of the initial processing for the cameras in accordance with the first preferred embodiment of the present invention.

Next, the processing protocol for processing at the startup of the video cameras 1 and 3 (initial processing) will be described. FIG. 6 is a flowchart illustrating the processing protocol of the initial processing for the cameras 1 and 3 in accordance with the first preferred embodiment of the present invention. In the first preferred embodiment, of the video cameras 1 and 3 included in the communication system 100, the video camera of the video cameras 1 and 3 that starts operating first is in the parent status, and the video camera that operates the second time and thereafter is in the child status. (Step 1401)

When the video cameras 1 and 3 are started up, the control unit 15 begins the initial processing. After that, processing proceeds to step S1402.
(Step 1402)

The control unit 15 performs parent device detection processing. Parent device detection processing judges whether or not there exists a video camera 1, 3 in the parent state within the communication system 100. If the control unit 15 judges that there is no video camera 1, 3 in the parent status within the communication system 100, processing proceeds to step S1403, but if the control unit 15 judges that there is a video camera 1, 3 in the parent status within the communication system 100, processing proceeds to step S1404. In the first preferred embodiment, only a video camera 1, 3 that is in the parent status performs terminal exploring processing and table updating processing, to be described later, and transmits an exploring signal to each device in the communication system 100 at regular intervals. For this reason, if the wireless communication unit 13 does not receive an exploring signal within a prescribed amount of time, the control unit 15 judges that there is no video camera 1, 3 that is in the parent status, and if the wireless communication unit 13 receives an exploring signal within the prescribed amount of time, the control unit 15 judges that there is a video camera 1, 3 in the parent status.

(Step S1403)

The control unit 15 performs parent device setting processing to make its own device a parent device. After that, processing proceeds to step S1405. The parent device setting processing is processing that sets the local device to be a parent device and initializes the identification information control table and the communication status control table. Then, it establishes the identification information of the local device, causes the established device identification information, the local device ID number, and the local device power supply status in association with one another in the identification information control table, and further performs processing that causes display of the established device identification information on the identification information display devices 5 and 8.

As a method for setting the parent device, for example, the control unit 15 causes the storage unit 51 to store parent device information. Also, the initialization of the identification information control table and the communication status control table is processing that deletes the information stored in each table. Although various methods of establishing the device identification information can be envisioned, in the first preferred embodiment this is established in the setting sequence of model name and device identification information. For example, the model name of the video camera 1, 3 is made C, and the model name of the display 2, 4 is made D. The model name is made the first character of the device identification information. The character following the first character is a number that is the device identification information setting sequence number among the same model. Specifically, of the displays 2 and 4 within the communication system 100, if the device identification information for the display 2 is established first, the device identification information of the display 2 would be D1. Also, of the displays 2 and 4 within the communication system 100, if the device identification information for the display 4 is established second, the device identification information of the display 4 would be D2.

(Step S1404)

The control unit 15 performs child device setting processing that makes its own device a child device. After that, processing proceeds to step S1405. The child device setting processing is processing that sets the local device to be a child device. As the method of setting the child device, for example, the control unit 15 causes the storage unit 51 to store child device information.

(Step S1405)

The control unit 15 starts up the main processing. After that, the initial processing is ended.

By executing the above-described initial processing, a video camera 1, 3 can set whether the local device is a parent device or a child device. If the local device is a parent device, the identification information control table and the communication status control table are initialized. Additionally, the device identification information of the local device is established, the established device identification information, local device ID number, and local device power supply status are stored in the identification information control table in association with one another, and the established device identification information is caused to be displayed on the identification information display device 5, 8.

Specifically, if the video camera 1 starts up first, after which the video camera 3 starts up, the video camera 1 sets itself as a parent device. Then, it establishes its identification information as C1, stores the established identification information C1, the local device ID number 0001, and the local device power supply status of on in the identification information control table in association with one another, and causes display of the established identification information C1 on the identification information display device 5, 8. The video camera 3 sets itself as a child device.

Figure 7:
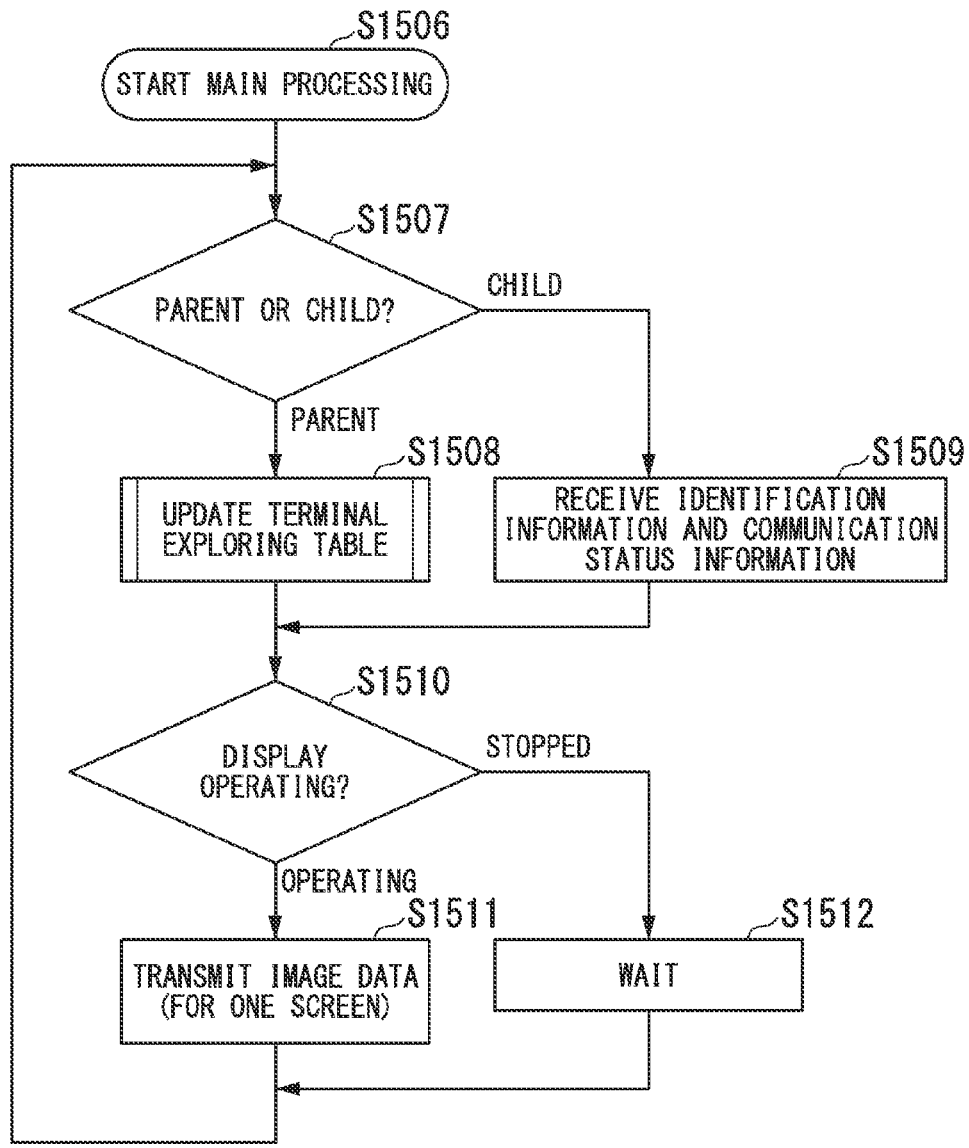
FIG. 7 is a flowchart illustrating the processing protocol of the main processing of the video camera in accordance with the first preferred embodiment of the present invention.

Next, the processing protocol for the main processing of the video camera 1, 3 will be described. FIG. 7 is a flowchart illustrating the processing protocol of the main processing of the video camera 1, 3 in accordance with the first preferred embodiment of the present invention. The main processing is executed in the video camera 1, 3 until each of the device power supplies are set to off.

(Step S1506)

When the main processing starts up at the initial processing step S1405, the control unit 15 starts the main processing. After that, processing proceeds to step S1507.

(Step S1507)

The control unit 15 judges whether its device is a parent device or a child device (parent/child judgment). Then, if the control unit 15 judges that its device is a parent device, processing proceeds to step S1508, and if the control unit 15 judges that its device is a child device, processing proceeds to step S1509. As an example of parent/child judgment, the control unit 15 reads out the parent or child information that has been caused to be stored in the storage unit 51 in the initial processing, judging that its device is a parent device if the read-out information is parent and that its device is a child device if the read-out information is child.

(Step S1508)

The control unit 15 executes terminal exploring processing and table updating processing. After that, processing proceeds to step S1510. The terminal exploring processing and table updating processing will be described later.

(Step S1509)

The control unit 15 executes the table receiving processing. The table receiving processing is processing that receives the local device identification information and communication status information that is transmitted from the video camera 1, 3 that is in the parent status. The control unit 15 also causes the received device identification information of the local device to be displayed on the identification information display device 5, 8. After that, processing proceeds to step S1510.

(Step S1510)

The control unit 15, based on the communication status information received at step S1509, judges whether or not the display 2, 4 pre-established as the communication destination display 2, 4 of the local device is operating. If the control unit 15 judges that the local device communication destination display 2, 4 is operating, processing proceeds to step S1511, and if the control unit 15 judges that the local device communication destination display 2, 4 is not operating, processing proceeds to step S1512.

(Step S1511)

The control unit 15 controls the wireless communication unit 13 so that the image data for one screen that has been captured by the imaging unit 11 and image-processed by the image processing unit 12 is transmitted to the display unit 2, 4. After that, processing returns to step S1507.

(Step S1512)

After a certain amount of waiting time, the control unit 15 returns to the processing of step S1507.

Figure 8:
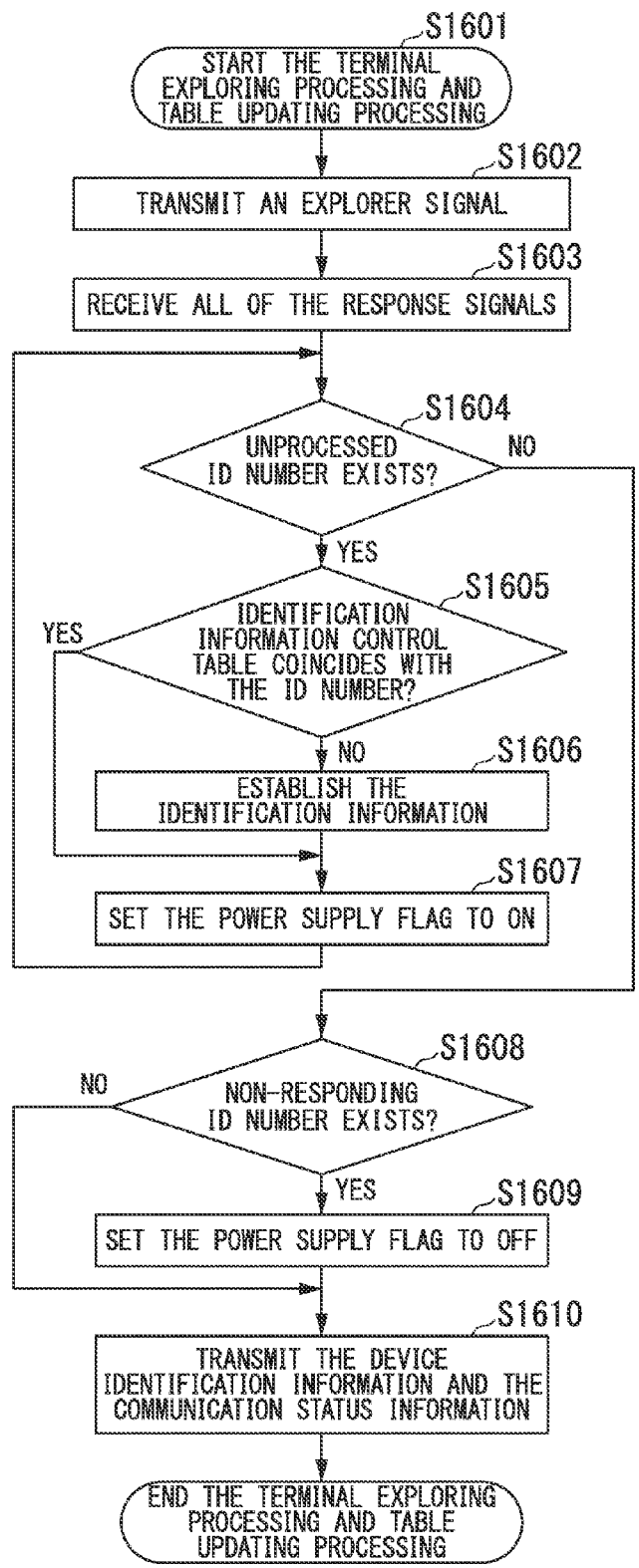
FIG. 8 is a flowchart illustrating the processing protocol of the terminal exploring processing and table updating processing of the video cameras in accordance with the first preferred embodiment of the present invention.

Next, the processing protocol for the terminal exploring processing and table updating processing of the video cameras 1 and 3 will be described. FIG. 8 is a flowchart illustrating the processing protocol of the terminal exploring processing and table updating processing of the video cameras 1 and 3 in accordance with the first preferred embodiment of the present invention.

(Step S1601)

The control unit 15 starts the terminal exploring processing and the table updating processing. After that, processing proceeds to step S1602.

(Step S1602)

The control unit 15 controls the wireless communication unit 13 and transmits an explorer signal (explorer packet) to each device including within the communication system 100. After that, processing proceeds to step S1603. Upon a device receiving the explorer signal, the device transmits to the video camera 1, 3 that has transmitted the explorer signal a response signal that includes an ID number that is a number uniquely assigned to the local device beforehand.

(Step S1603)

The wireless communication unit 13, via the antenna 14, receives the response signal transmitted from the device to which the explorer signal has been transmitted at step S1602. The control unit 15 counts the number of response signals received by the wireless communication unit 13 as the number of unprocessed IDs. After that, processing proceeds to step S1604.

(Step S1604)

If the number of unprocessed IDs is one or greater, the control unit 15 judges that the there is an ID number among the ID numbers included in the response signals for which the processing of step S1605 to step S1607 has not been performed, and processing proceeds to step S1605. If the number of unprocessed IDs is zero, the control unit 15 judges that, among the ID numbers included in the response signals, received at step S1602, there are no ID numbers for which the processing of step S1605 to S1607 has not been performed, and processing proceeds to step S1608.

(Step 1605)

The control unit 15 selects one ID number for which the processing of step S1605 to step S1607 has not been performed and judges whether the selected ID number coincides with an ID number stored in the identification information control table. The control unit 15 also subtracts 1 from the number of unprocessed ID numbers. If the control unit 15 judges that the selected ID number coincides with an ID number stored in the identification information control table, processing proceeds to step S1607, and if the control unit 15 judges that the selected ID number does not coincide with an ID number stored in the identification information control table, processing proceeds to step S1606.

(Step S1606)

The control unit 15 establishes the device identification information of a device that is identified by the selected ID number at step S1605, and stores the ID number and the established identification information, in association with one another, in the identification information control table. After that, processing proceeds to step S1607. The method of establishing the device identification information is the method described with regard to the parent device setting processing.

(Step S1607)

The control unit 15, of the power supply flags stored in the identification information control table, sets the power supply flag of the ID number selected at step S1605 to on. After that, processing proceeds to step S1604.

(Step S1608)

The control unit 15 compares the ID numbers included in the response signals received at step S1603 with the ID numbers stored in the identification information control table. The control unit 15 then detects as a non-responding ID number an ID number that is not included in the response signals, is stored in the identification information control table, and also has a power supply status flag that is on. If the control unit 15 detects a non-responding ID number, processing proceeds to step S1609, and if the control unit 15 does not detect a non-responding ID number, processing proceeds to step S1610.

(Step S1609)

The control unit 15, of the power supply flags stored in the information control table, sets to off the power supply flag of the ID number detected as a non-responding ID number at step S1608 (performs power supply status flag off-setting processing). After that, the terminal exploring processing and the table updating processing are ended, and processing proceeds to step S1610.

(Step S1610)

The control unit 15, of the power supply flags stored in the information control table, transmits the device identification information and the communication status information for each device to a device that is uniquely identified by an ID number of which the power supply flag is on. After that, the terminal exploring processing and table updating processing are ended, and processing proceeds to step S1510 of the main processing.

If a video camera 1, 3 becomes a parent device by the execution of the above-described initial processing, main processing, terminal exploring processing, and table updating processing, it is possible to perform display information creation operation. This display information creation operation is operation that generates the identification information and the communication status information of both the parent device and the child device included within the communication system 100, and transmits the generated identification information and communication status information of the child device to each of the devices that are child devices included within the communication system 100. Also, if a video camera 1, 3 has become a child device, it can receive its device identification information from the video camera 1, 3 that has become a parent device, and can display the received device identification information on the identification information display device 5, 8 mounted thereon. Also, in both the case in which a video camera 1, 3 has become a parent device and the case in which it becomes a child device, if the display 2, 4 that is its communication destination is currently operating, it can transmit captured image data to the display 2, 4.

Next, the operation of the displays 2 and 4 will be described. The wireless communication unit 17 of a display 2, 4 receives device identification information, communication status information, and image data transmitted from the video camera 1, 3, via the antenna 16. Then, if the wireless communication unit 17 has received device identification information, the control unit 20 causes the received device identification information to be displayed on the identification information display device 7, 10. If the wireless communication unit 17 has received communication status information, the control unit 20 causes the received communication status information to be displayed on the communication status display device 6, 9. If the wireless communication unit 17 has received image data, the control unit 20 causes the image processing unit 18 to image-process and display on the image display device 19 the received image data. By doing this, the display 2,4 can display the device identification information on the identification information display device 7, 10. The display 2, 4 can also display the communication status information on the communication status display device 6, 9. The display 2, 4 can cause display of the image data on the image display unit 19.

Next, the specific operation of the communication system 100 of the first preferred embodiment will be described.

Specific Example 1 of First Preferred Embodiment

The case in which, in the communication system 100, the power supply of the display 2 is on, the power supplies of the display 4 and the video cameras 1 and 3 are off, the power supply of the video camera 1 is on, and the power supplies of the video camera 3 and the display 4 are turned on next.

Specific Example 2 of First Preferred Embodiment

The case in which, in the communication system 100, the power supply of the video camera 1 is off, the power supplies of the video camera video 3 and the displays 2 and 4 are sequentially set to on, and then the power supply of the video camera 1 is set to on.

The above-noted two specific examples will be described.

Specific Example 1 of First Preferred Embodiment

Because the video camera 1 will be a parent device, the video camera 1 sequentially performs the processing of step S1401, step S1402, and step S1403 shown in FIG. 6 in the initial processing, establishing the device identification information of the video camera 1 as C1 by the processing of step S1403, causing the identification information display device 5 to display C1, and starting up the main processing at step S1405. Continuing, the video camera 1 executes the main processing and, by the processing at step S1508 (step S1601 to step S1610) detects the display 2, and establishes the device identification information of the detected display 2 as D1. The video camera 1 also transmits the device identification information and the communication status information to the display 2.

The display 2 receives the device identification information and the communication status information that have been transmitted by the video camera 1 executing the processing of step S1610. Then, the display 2 causes display of the received device identification information D1 on the identification information display device 7, and causes the received communication status information "C1→" to be displayed on the communication status display device 6. When this occurs, the video camera 1 repeatedly executes the processing of step S1507, step S1508, step S1510, and step S1511.

When the video camera 3 power supply is turned on, the video camera 1 detects the startup of the video camera 3 by the processing of step S1508, and establishes the device identification information of the detected video camera 3 as C2. The video camera 1 then transmits the device identification information and the communication status information to the video camera 3 and the display 2. The video camera 3 and the display 2 receive the device identification information and the communication status information that have been transmitted by execution of the processing of step S1610 by the video camera 1. Then, the video camera 3 causes the display of the received device identification information C2 on the identification information display device 8. The display 2 causes the display of the received device identification information D1 on the identification information display device 7, and the received communication status information "C1→" on the communication status display device 6.

Finally, when the display 4 power supply is turned on, the video camera 1 detects the display 4 by the processing of step S1508, and establishes the device identification information of the detected display 4 as D2. The video camera 1 also transmits the device identification information and the communication status information to the displays 2 and 4 and to the video camera 3.

The displays 2 and 4 and the video camera 3 received the device identification information and the communication status information that have been transmitted by the video camera 1 executing the processing of step S1610. The display 4 causes the display of the received device identification information D2 on the identification information display device 10, and causes the display of the received communication status information "C2→" on the communication status display device 9. The video camera 3 causes the display of the received device identification information C2 on the identification information display device 8. The display 2 causes the display of the device identification information D1 on the identification information display device 7, and causes the display of the received communication status information "C1→" on the communication status display device 6. At the point in time at which the video camera 1 or 3 being communicated with stops operating, the control units 20 of the display 2, 4 switch the right-direction arrow included in the communication status information to blank.

Specific Example 2 of First Preferred Embodiment

The power supply of the video camera 1 is off, and the power supplies of the video cameras 3 and the displays 2 and 4 are sequentially turned on. As a result, although the description of the detailed operation will be omitted, the video camera 3 becomes a parent device. Also, image data is transmitted and received between the video camera 3 and the display 4. The device identification information displayed by the identification information display device 8 mounted on the video camera 3 is C1. The device identification information displayed by the device information display device 7 that is mounted on the display 7 is D1. The device identification information displayed by the identification information display device 10 that is mounted on the display 4 is D2.

In this condition, when the video camera 1 power supply is turned on, in the initial processing, the video camera 1 sequentially performs the processing of step S1401, S1402 and then step S1404, setting the local device to be a child device. When this is done, the video camera 3, which is a parent device, executes the main processing, detects the video camera 1 with the processing of step S1508, and establishes the device identification information of the detected video camera 1 as C2. The video camera 3 transmits the device identification information and the communication status information to the video camera 1 and the displays 2 and 4.

The video camera 1 and the displays 2 and 4 receive the device identification information and the communication status information transmitted by the execution by the video camera 3 of the processing of step S1610. The video camera 1 then causes display of the received device identification information C2 on the identification information display device 5. The display 2 causes display of the received device identification information D1 on the identification information display device 7, and causes display of the received communication status information "C2→" on the communication status display device 6. Also, the display 4 causes display of the received device identification information D2 on the identification information display device 10 and causes display of the received communication status information "C1→" on the communication status display device 9.

As described above, according to the first preferred embodiment, the video cameras 1 and 3 and the displays 2 and 4 cause display of device identification information that uniquely displays each of the devices themselves on the displays 5, 7, 8, and 10. Also, the displays 2 and 4 cause display on the communication information display devices 6 and 9 of communication status information indicating the device identification information and communication information of the device with which each themselves are communicating. By doing this, because the device identification information and the communication status information are displayed in visual form, it is easy to grasp the operating status of and the connection relationship between each device.

Also, although the first preferred embodiment has been described using an example in which the device identification information is established using the model name and the sequence of setting the device identification information, this is not a restriction. For example, the method of establishing the device identification information may be that of using name of the manufacturer of a device, the manufacturing serial number of a device, or an abbreviated name of a device. As a specific example, instead of a number assigned in the sequence of establishing the device identification information, the lowest-order one digits of the manufacturing serial number of a device is used and, if there is duplication with other devices, the minimum number of digits are used that have not been used. Whereas in the case of assigning a number in the sequence of establishing the device identification information, the device identification information varies, depending upon the sequence in which devices are turned on, if the lowest-order digit of the manufacturing serial number of the device is used, the device identification information is semi-fixed, and the effect of an improvement in recognizability can also be expected. In this manner, while there are various methods of establishing the device identification information, regardless of the method used the device identification information is established so that devices within the communication system 100 are not assigned the same device identification information.

Second Preferred Embodiment

Figure 9:
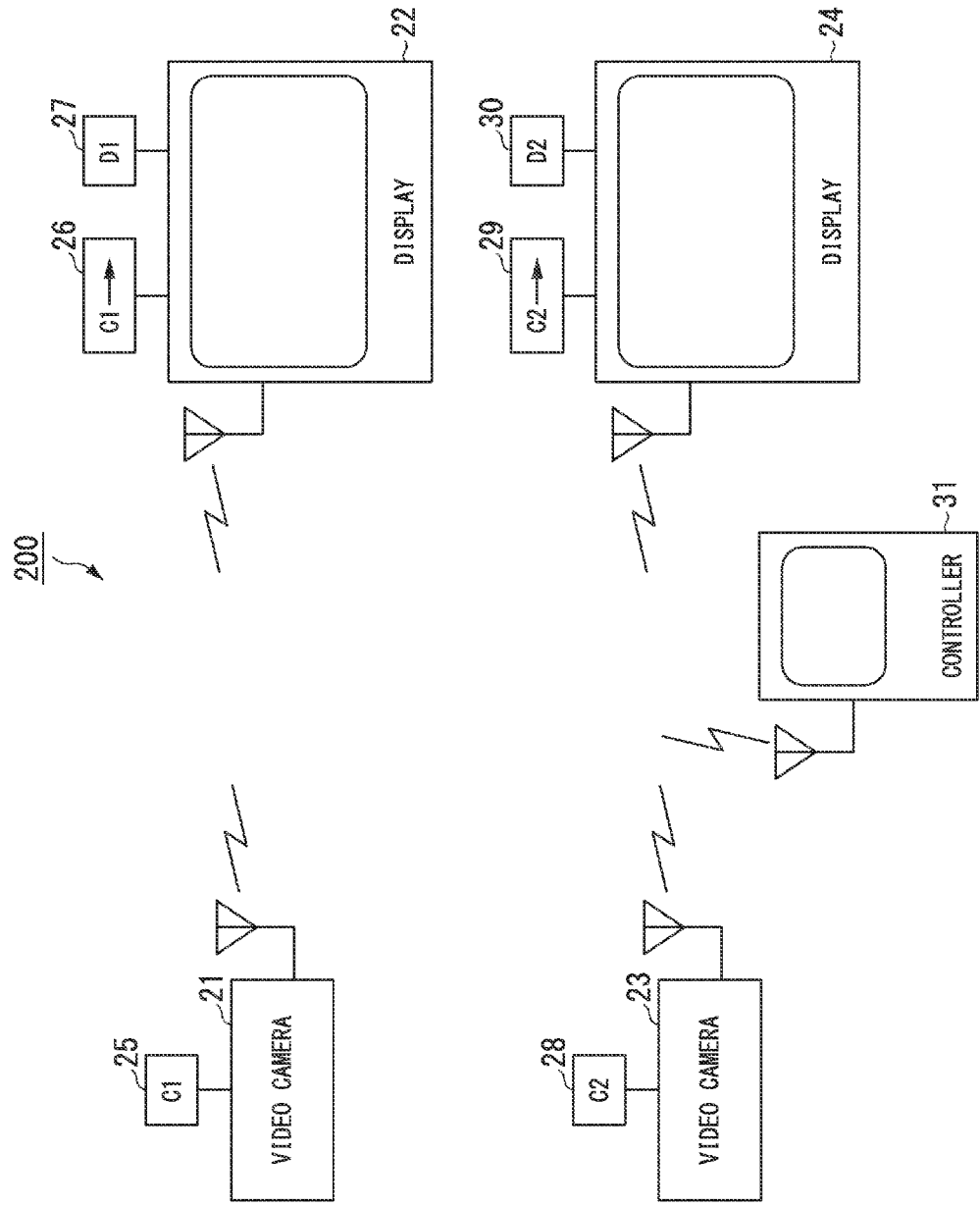
FIG. 9 is a simplified drawing illustrating the constitution of a wireless communication system in accordance with the second preferred embodiment of the present invention.

Next, the second preferred embodiment of the present invention will be described, with references being made to the drawings. FIG. 9 is a simplified drawing illustrating the constitution of a wireless communication system in accordance with the second preferred embodiment of the present invention. In the illustrated example, a wireless communication system 200 is constituted by two video cameras 21 and 23 that have the function of wirelessly transmitting captured image data, two displays 22 and 24 that receive and display the image data transmitted from the video cameras 21 and 23, and one controller 31 (connection switching device) that controls the video cameras 21 and 23 and the displays 22 and 24.

The video cameras 21 and 23 are constituted in the same manner as the video cameras 1 and 3 in the first preferred embodiment. The displays 22 and 24 are constituted in the same manner as the displays 2 and 4 in the first preferred embodiment. Whereas, in the first preferred embodiment, the combinations of the video cameras 1 and 3 and the displays 2 and 4 that communicate are pre-established and fixed, in the second preferred embodiment, the combinations of the video cameras 21 and 23 and the displays 22 and 24 that communicate can be arbitrarily changes by the operation of the controller 31.

An identification information display device 25 is mounted on the video camera 21, and an identification information display device 28 is mounted on the video camera 23. A communication status display device 26 and an identification information display device 27 are mounted on the display 22. A communication status display device 29 and an identification information display device 30 are mounted to the display 24. The identification information display devices 25, 27, 28, and 30 and the communication status display devices 26 and 29 are similar to the various parts of the first preferred embodiment. The second preferred embodiment differs from the first preferred embodiment in that the content displayed by the identification information display devices 25, 27, 28, and 30 and the communication status display devices 26 and 29 is set by the controller 31.

In the illustrated example, the identification information display device 25 displays the device identification information C1 of the video camera 21. The identification information display device 28 displays the device identification information C2 of the video camera 23. The identification information display device 27 displays the device identification information D1 of the display 22. The identification information display device 30 displays the device identification information D2 of the display 24. The communication status display device 26 displays C1, which is the device identification information of the communication destination video camera 21 of the display 22, and a right-direction arrow, which is information indicating that communication with the communication destination video camera 21 is in progress. The communication status display device 29 displays C2, which is the device identification information of the communication destination video camera 23 of the display 24, and a right-direction arrow, which is information indicating that communication with the communication destination video camera 23 is in progress.

As described above, because the identification information display devices 25, 27, 28, and 30 display the device identification information that uniquely identifies their own devices, and the communication status display devices 26 and 29 display the communication status information indicating the communication destinations and communication status of the displays 22 and 24, a user can easily verify in a visual manner the combinations of video cameras 21 and 23 and the displays 22 and 24, which perform communication.

Figure 10:
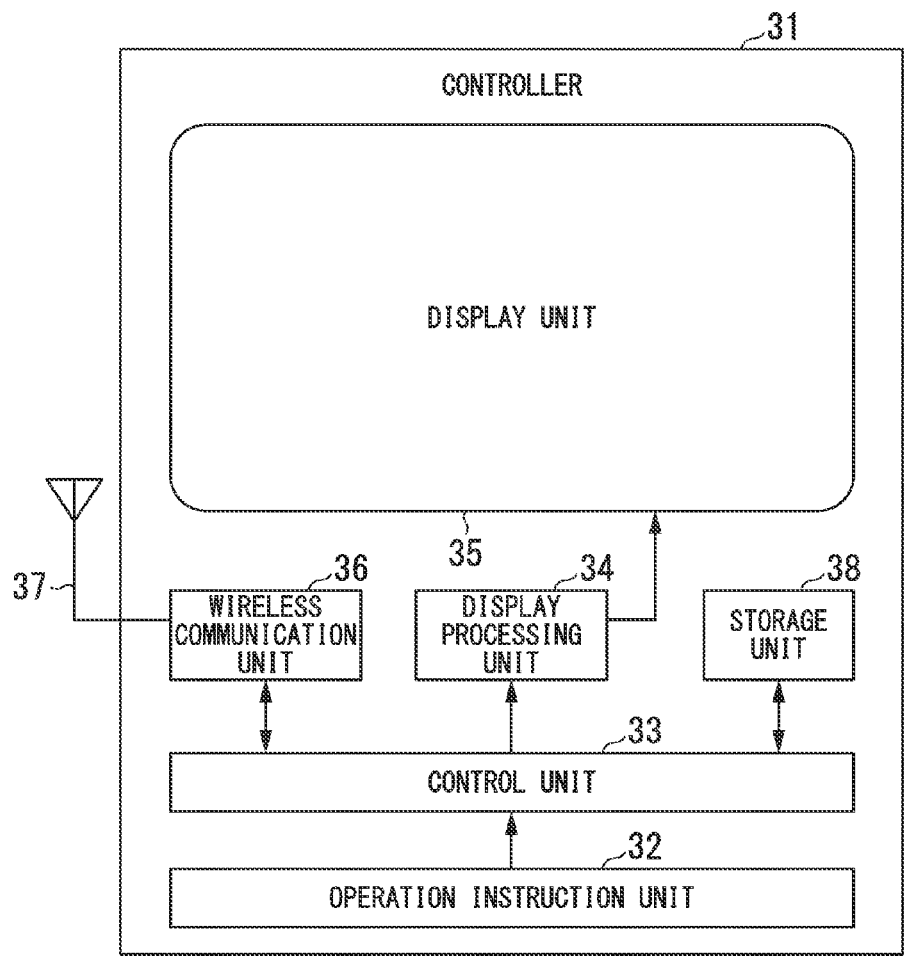
FIG. 10 is a block diagram illustrating the constitution of the controller in accordance with the second preferred embodiment of the present invention.

Next, the constitution of the controller 31 will be described. FIG. 10 is a block diagram illustrating the constitution of the controller 31 in accordance with the second preferred embodiment of the present invention. In the illustrated example, the controller 31 has an operation instruction unit 32, a control unit 33, a display processing unit 34, a display unit 35, a wireless communication unit 36, an antenna 37, and a storage unit 38.

The operation instruction unit 32 is operated by the user and accepts input of an instruction from the user. The content of an instruction, the input of which is accepted by the operation instruction unit 32, is passed to the control unit 33. The control unit 33 controls various parts of the controller 31 so that operation is performed in accordance with the passed instruction content. Also, depending upon the instruction content, the input of which is accepted by the operation instruction unit 32, the control unit 33 generates control data. The generated control data is then passed to the wireless communication unit 36 and transmitted via the antenna 37 to the desired video camera 21, 23 or display 22, 24. The storage unit 38 stores information necessary for processing by the various parts of the controller 31.

Figure 11:
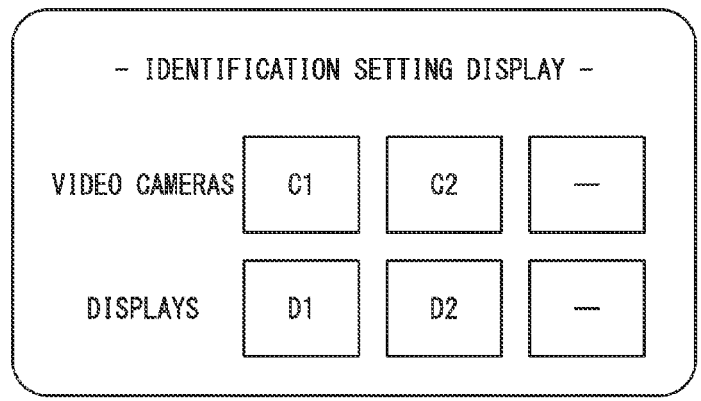
FIG. 11 is a simplified drawing illustrating the identification information display screen in accordance with the second preferred embodiment of the present invention.

Next, an identification information display screen displayed on the display unit 35 of the controller 31 will be described. FIG. 11 is a simplified drawing illustrating the identification information display screen in accordance with the second preferred embodiment of the present invention. The identification information display screen is a screen displayed by the display unit 35 of the controller 31, this being a screen that displays a listing of the device identification information of the video cameras 21 and 23, and the displays 22 and 24 included in the communication system 200. In the illustrated example, C1 and C2 are displayed as the device identification information of the video cameras 21 and 23, and D1 and D2 are displayed as the device identification information of the displays 22 and 24. By a user instruction, the controller 31 can change the content of the device identification information.

Figure 12A:
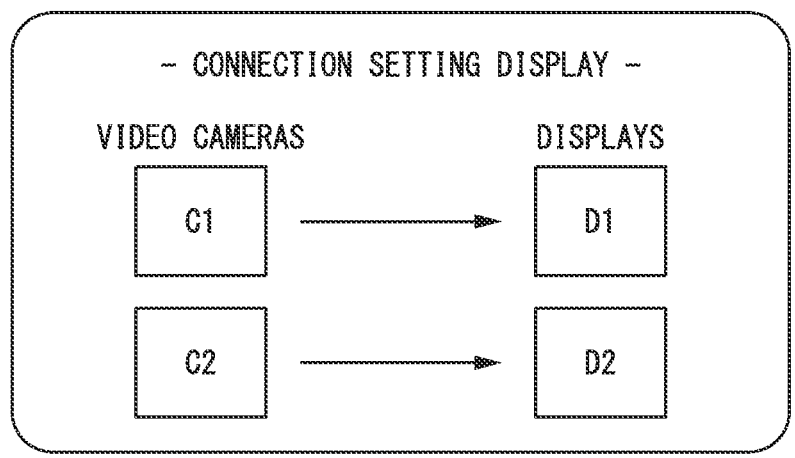
FIG. 12A is a simplified drawing illustrating connection information display screens in accordance with the second preferred embodiment of the present invention.
Figure 12B:
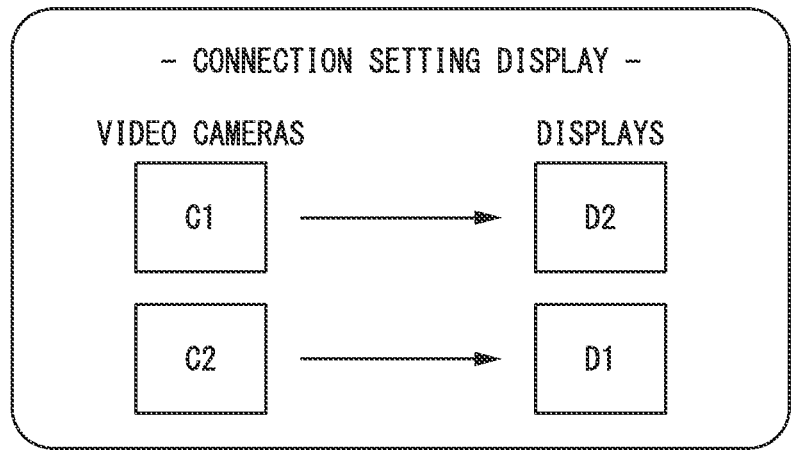
FIG. 12B is a simplified drawing illustrating connection information display screens in accordance with the second preferred embodiment of the present invention.

Next, a connection information display screen displayed by the display unit 35 of the controller 31 will be described. FIG. 12A and FIG. 12B are simplified drawings illustrating connection information display screens in accordance with the second preferred embodiment of the present invention. The connection information display screen is a screen that is displayed by the display unit 35 of the controller 31, this screen illustrating the combinations of connections between the video cameras 21 and 23 and the displays 22 and 24 included in the communication system 200.

The example shown in FIG. 12A indicates that the video camera 21 having the device identification information of C1 and the display 22 having the device identification information of D1 are communicating. It also indicates that the video camera 23 having the device identification information of C2 and the display 24 having the device identification information of D2 are communicating. In this condition, the user inputs to the operation instruction unit 32 of the control unit 31 an instruction to make the communicating combination the combination of the video camera 21 having the device identification information of C1 and the display 24 having the device identification information of D2, and the combination of the video camera 23 having the device identification information of C2 and the display 22 having the device identification information of D1. If control by the controller 31 then changes the combinations of the video cameras 21 and 23 and the displays 22 and 24 that communicate, the connection information display screen displayed by the display unit 35 of the controller 31 becomes the screen shown in FIG. 12B. The example shown in FIG. 12B indicates that the video camera 21 having the device identification information of C1 and the display 24 having the device identification information of D2 are communicating. It also indicates that the video camera 23 having the device identification information of C2 and the display 22 having the device identification information of D1 are communicating.

Figure 13:
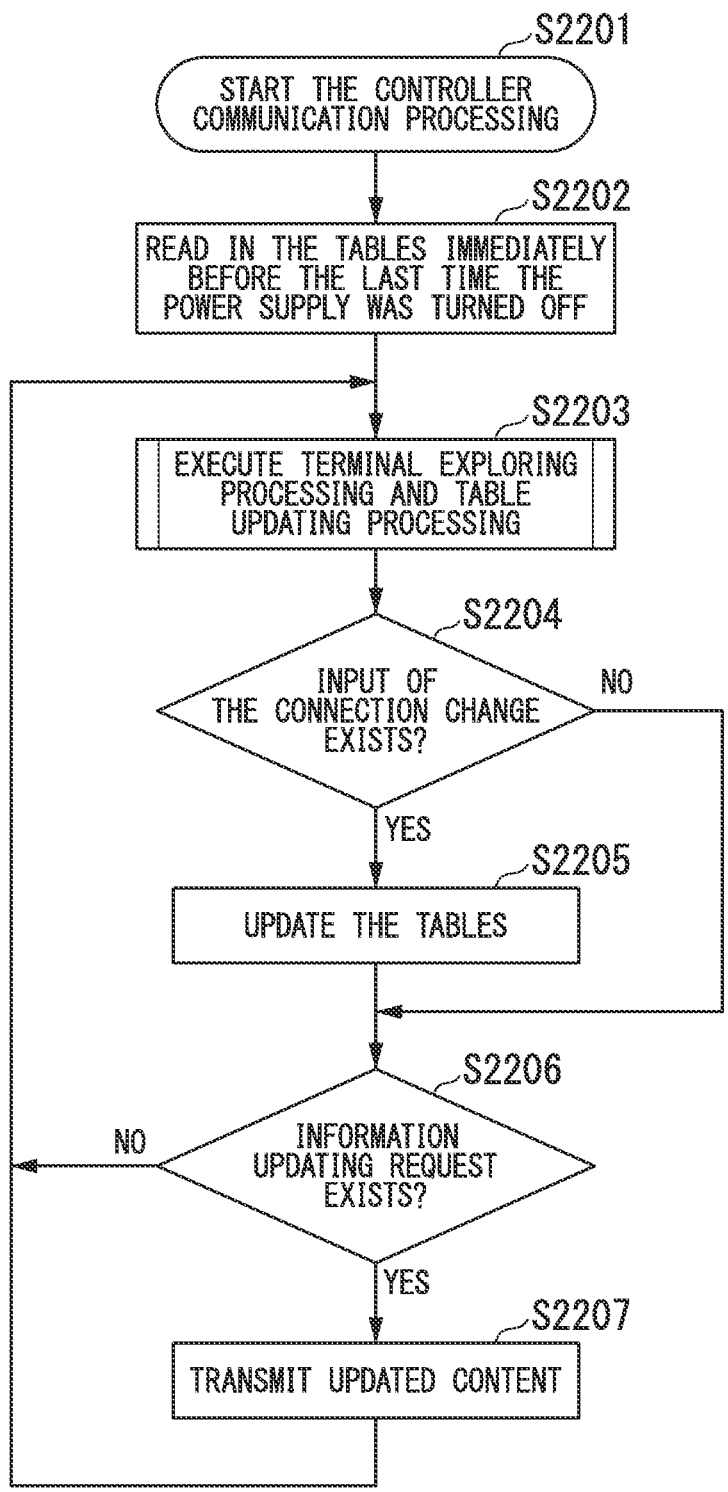
FIG. 13 is a flowchart illustrating the processing protocol for controller communication processing by the controller in accordance with the second preferred embodiment of the present invention.

Next, the processing protocol for controller communication processing by the controller 31 will be described. FIG. 13 is a flowchart illustrating the processing protocol for controller communication processing by the controller 31 in accordance with the second preferred embodiment of the present invention. The controller communication processing is executed until the controller 31 power supply is turned off.
(Step S2201)
The control unit 33 of the controller 31 starts the controller communication processing. After that, processing proceeds to step S2202.

(Step S2202)
The control unit 33 reads in the identification information control table and the communication status control table that had been caused to be stored in the storage unit 38 immediately before the last time the power supply of the controller 31 was turned off. Based on the information stored in the read-in identification information control table and communication status control table, the control unit 33 causes the display processing unit 34 to perform display processing, and causes the display unit 35 to display the connection information display screen. After that, processing proceeds to step S2203.
(Step S2203)
The control unit 33 executes terminal exploring processing and table updating processing. After that, processing proceeds to step S2204. The terminal exploring processing and the table updating processing will be described later.
(Step S2204)
The control unit 33 judges whether or not the operation instruction unit 32 has accepted an input of a connection change. If the control unit 33 judges that the operation instruction unit 32 has accepted the input of a connection change, processing proceeds to step S2205, and if the control unit 33 judges that the operation instruction unit 32 has accepted the input of a connection change, processing proceeds to step S2206.
(Step S2205)
The control unit 33, based on the input of a connection change accepted by the operation instruction unit 32, updates the identification information control table and the communication status control table stored in the storage unit 38. The control unit 33 updates the display content of the connection information display screen displayed on the display unit 35 based on the information stored in the identification information control table and the communication status control table after updating. After that, processing proceeds to step S2206.
(Step 2206)
The control unit 33 judges whether or not the wireless communication unit 36 has received an information updating request signal transmitted from another device. If the control unit 33 judges that the wireless communication unit 36 has received an information updating request signal, processing proceeds to step S2207, and if the control unit 33 judges that the operation instruction unit 32 has not accepted input of a connection change, processing returns to step S2203.
(Step S2207)
The control unit 33 reads out the device identification information and the communication status information of device that is the transmission source of the information updating request signal, which is stored in the identification information control table and the communication status control table stored in the storage unit 38. The control unit 33 then judges whether or not the read-out device identification information and communication status information have been further updated after the last transmission to the device that is the transmission source of the information updating request signal. The control unit 33 then controls the communication unit 36 and transmits to the device that is the source of the transmission of the information updating request signal the result of the judgment of whether or not there has been an updating. If the judgment is made that the device identification information and the communication status information had been updated to the device that is the transmission source of information updating request signal since the last transmission, the control unit 33 controls the communication unit 36 to transmit the read-out device identification information and communication status information to the device that is the source of the information updating request signal. After that, processing returns to step S2203.

Figure 14:
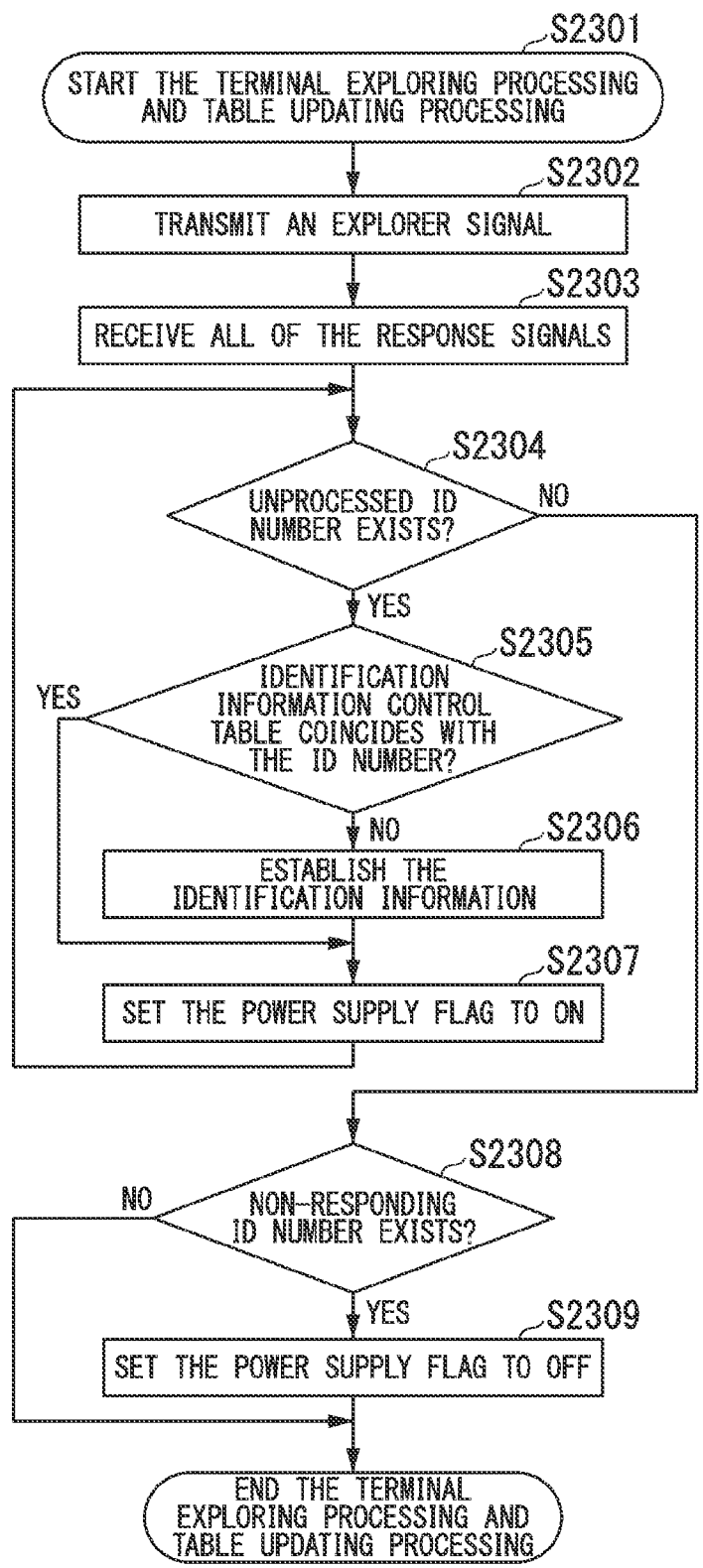
FIG. 14 is a flowchart illustrating the processing protocol of the terminal exploring processing and the table updating processing by the controller in accordance with the second preferred embodiment of the present invention.

Next, the processing protocol of the terminal exploring processing and the table updating processing of the controller 31 will be described. FIG. 14 is a flowchart illustrating the processing protocol of the terminal exploring processing and the table updating processing by the controller 31 in accordance with the second preferred embodiment of the present invention. The point of difference with respect to the terminal exploring processing and table updating processing in the first preferred embodiment is that the terminal exploring processing and table updating processing in the second preferred embodiment does not perform the processing of step S1610 of FIG. 6.

Because the processing of step S2301 to step S2307 is processing that is the same as the processing of step S1601 to step S1607 in the first preferred embodiment, the description thereof will be omitted.
(Step S2308)

The control unit 33 compares the ID numbers included in the response signals received at step S2303 with the ID numbers stored in the identification information control table. The control unit 33 then detects as a non-responding ID number an ID number that is not included in the response signals, is stored in the identification information control table, and also has a power supply status flag that is on. If the control unit 33 detects a non-responding ID number, processing proceeds to step S2309, and if the control unit 33 does not detect a non-responding ID number, the terminal exploring processing and table updating processing are ended, and processing proceeds to step S2204 of the controller communication processing.
(Step S2309)

The control unit 33, of the power supply flags stored in the information control table, sets to off the power supply flag of the ID number detected as a non-responding ID number at step S2308 (performs power supply flag off-setting processing). After that, the terminal exploring processing and table updating processing are ended, and processing proceeds to step S2204 of the controller communication processing.

By executing the above-described controller communication processing, and the terminal exploring processing and table updating processing, the controller 31 can update the device identification information and communication status information of each device included in the communication system 100.

Figure 15:
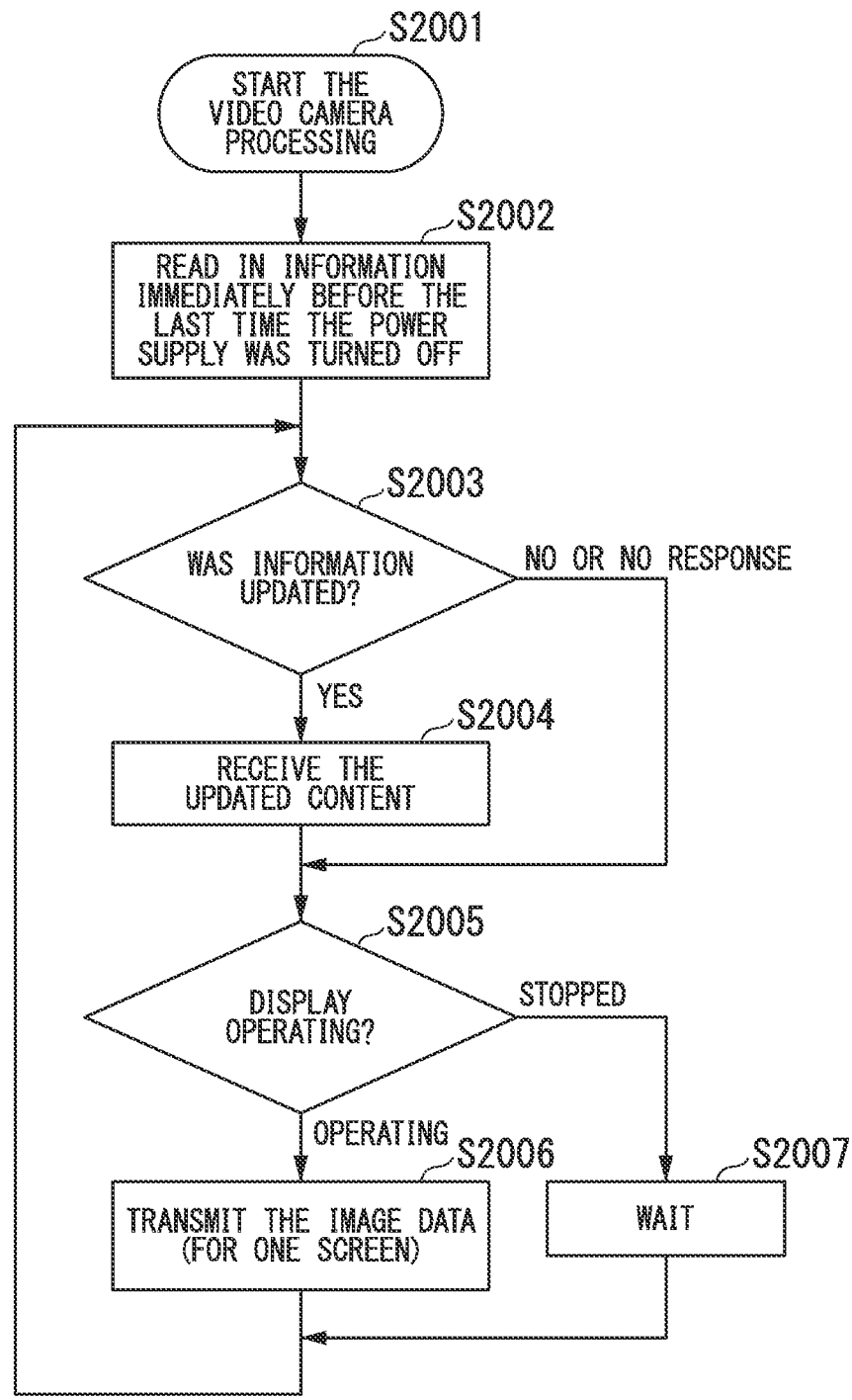
FIG. 15 is a flowchart illustrating the processing protocol of the video cameras in accordance with the second preferred embodiment of the present invention.

Next, the processing protocol of the video camera processing of the video cameras 21 and 23 will be described. FIG. 15 is a flowchart illustrating the processing protocol of the video cameras 21 and 23 in accordance with the second preferred embodiment of the present invention. The video camera processing is executed in the video cameras 21 and 23 until the power supplies of each of the devices is turned off.
(Step S2001)

The control unit 15 of the video cameras 21 and 23 starts the video camera processing when its power supply is turned on. After that, processing proceeds to step
(Step S2002)

The control unit 15 reads in the device identification information and the communication status information that had been caused to be stored in the storage unit 51 immediately before the last time the power supply of the local device was turned off. After that, processing proceeds to step S2003.
(Step S2003)

The control unit 15 controls the wireless communication unit 13 so as to transmit an information updating request signal to the controller 31. As described above, having received an information updating request signal, the controller 31 transmits to the video camera 21, 23 that has transmitted the information updating request signal the result of the judgment of whether or not updating had been done after the last time the device identification information and the communication status information have been transmitted. The wireless communication unit 13 receives the judgment result via the antenna 14. The control unit 15, based on the judgment result received by the wireless communication unit 13, judges whether or not the device identification information and the communication status information had been updated. If the control unit 15 judges that the device identification information and the communication status information had been updated, processing proceeds to step S2004, and if the control unit 15 judges that updating had not been done, processing proceeds to step S2005. After transmission of the information updating request signal, if the wireless communication unit 13 did not receive the judgment result for the reason that the controller 31 does not operate, processing proceeds to step S2005.
(Step S2004)

As described above, if the controller 31 judges that updating has been done after the last time the device identification information and the communication status information were transmitted to the device that is the transmission source of the information updating request signal, the device identification information and the communication status information after updating are transmitted. The wireless communication unit 13 receives the updated device identification information and communication status information via the antenna 14. The control unit 15 updates the device identification information and the communication status information stored in the storage unit 51 to the device identification information and the communication status information received by the wireless communication unit 13. The control unit 15 also causes the identification information display device 25, 28 mounted to its own device to display the device identification information of its own device stored in the storage unit 51. After that, processing proceeds to step S2005.
(Step S2005)

The control unit 15, based on the communication status information stored in the storage unit 51, judges whether or not the display 22, 24 that is the communication destination of its own device is operating. If the control unit 15 judges that the display 22, 24 that is its device's communication destination is operating, processing proceeds to step S2006, and if the control unit 15 judges that the display 22, 24 that is the communication destination of its own device is not operating, processing proceeds to step S2007.
(Step S2006)

The control unit 15 controls the wireless communication unit 13 so that the image data for one screen that has been captured by the imaging unit 11 and image-processed by the image processing unit 12 is transmitted to the display unit 22, 24. After that, processing returns to step S2003.
(Step 2007)

After a certain amount of waiting time, the control unit 15 returns to the processing of step S2003.

By executing the above-described video camera processing, even if there had been updating of the device identification information and the communication status information of the local device, the video camera 21, 23 can receive the device identification information and the communication status information of the local device from the controller 31. Then, the video camera 21, 23 can cause the updated device identification information to be displayed on the identification information display device 25, 28 mounted to its device.

Also, based on the communication status information, the video camera 21, 23 can identify the display 22, 24 that is the communication destination of its own device and, if the display 22, 24 that is its device's communication destination is operating, it can transmit the captured image data to the display 22, 24.

Next, the processing protocol of the display processing of the displays 22 and 24 will be described. FIG. 16 is a flowchart illustrating the processing protocol of the displays 22 and 24 in accordance with the second preferred embodiment of the present invention. The display processing is executed in the displays 22 and 24 until the power supply of each device is turned off.

(Step S2101)

The control unit 20 of the display 22, 24 starts the display processing when the power supply of its device is turned on. After that, processing proceeds to step S2102.

(Step S2102)

The control unit 20 reads in the device identification information and the communication status information stored in the storage unit 52 immediately before the last time the power supply of the local device was turned off. After that, processing proceeds to step S2103.

(Step S2103)

The control unit 20 controls the wireless communication unit 17 to transmit an information updating request signal to the controller 31. As described above, upon receiving an information updating request signal, the controller 31 transmits to the display 22, 24 that has transmitted an information updating request signal the result of the judgment of whether or not updating had been done after the last time the device identification information and the communication status information were transmitted. The wireless communication unit 17 receives the judgment result via the antenna 16. The control unit 20, based on the result of the judgment received by the wireless communication unit 17, judges whether or not the device identification information and the communication status information had been updated. If the control unit 20 judges that the device identification information and the communication status information had been updated, processing proceeds to step S2104, and if the control unit 20 judges that updating had not been done, processing proceeds to step S2105. After transmission of the information updating request signal, if the wireless communication unit 17 did not receive the judgment result for the reason that the controller 31 does not operate, processing proceeds to step S2105.

(Step S2104)

As described above, if the controller 31 judges that updating had been done after the last time the device identification information and the communication status information were transmitted to the device that is the transmission source of the information updating request signal, the device identification information and the communication status information after updating are transmitted. The wireless communication unit 17 receives the updated device identification information and communication status information via the antenna 16. The control unit 20 updates the device identification information and the communication status information stored in the storage unit 52 to the device identification information and the communication status information received by the wireless communication unit 17. The control unit 20 also causes the identification information display device 27, 30 mounted to its own device to display the device identification information of its own device stored in the storage unit 52. The control unit 20 also causes the communication status display device 26, 29 mounted to its own device to display the communication status information stored in the storage unit 52. After that, processing proceeds to step S2105.

(Step S2105)

The control unit 20, based on the communication status information stored in the storage unit 52, judges whether or not the video camera 21, 23 that is the communication destination of its own device is operating. If the control unit 20 judges that the video camera 21, 23 that is its device's communication destination is operating, processing proceeds to step S2016, and if the control unit 20 judges that the video camera 21, 23 that is the communication destination of its own device is not operating, processing proceeds to step S2107.

(Step S2106)

The control unit 20 controls the wireless communication unit 13 so as to receive the image data for one screen transmitted from the communication destination video camera 21, 23. The control unit 20 also causes the image processing unit 18 to image-process the received image data and causes display on the image display unit 19.

(Step S2107)

After a certain amount of waiting time, the control unit 20 returns to the processing of step S2103.

By executing the above-described display processing, even if there had been updating of the device identification information and the communication status information of the local device, the display 22, 24 can receive the device identification information and the communication status information of the local device from the controller 31. Then, the display 22, 24 can cause display of updated device identification information on the identification information display device 25, 28 mounted to its device, and cause display of the updated communication status information on the communication status display 26, 29. The display 22, 24 can cause display, on the image display unit 19, of the image data transmitted from the video camera 21, 23 that is its communication destination.

Next, the specific operation of the communication system 200 of the second preferred embodiment will be described.

Specific Example 1 of Second Preferred Embodiment

The case in which, in the communication system 200, the power supplies of the video camera 21 and the display 22 are on, the power supplies of the video camera 23, the display 24, and controller 31 are off, and, in the condition in which the video camera 21 and the display 22 are communicating, the power supply of the controller 31 is turned on.

Specific Example 2 of Second Preferred Embodiment

The case in which, in the condition in which the communication system 200, the power supplies of the controller 31, the video cameras 21 and 23, and the displays 22 and 24 are on, the video camera 21 and the display 22 are communicating, and the video camera 23 and the display 24 are communication, the user inputs a connection change to the operation instruction unit 32 of the controller 31, the communication destination of the video camera 21 being switched to the display 24 and the communication destination of the video camera 23 being switched to the display 22.

The above-noted two specific examples will be described.

Specific Example 1 of Second Preferred Embodiment

Video Camera 21 Processing

Immediately after its own device power supply is turned on, the video camera 21 sequentially performs the processing of step S2001 and then step S2002 shown in FIG. 15, and reads in the device identification information and the communication status information that had been stored in the storage unit 51 immediately before the last time the power supply of its device was turned off. Next, in the processing of step S2003, an information updating request signal is transmitted to the controller 31, and a query is made as to whether or not there is updating of the device identification information and the communication status information. If there is updating of the device identification information and the communication status information, by the processing of step S2004 the updated device identification information and the communication status information transmitted from the controller 31 are received, the device identification information and the communication status information stored in the storage unit 51 being updated to the received device identification information and communication status information, and processing proceeding to step S2005. If, in the processing of step S2003, there had been no updating of the device identification information and the communication status information, or if the controller 31 is not operating and there is no response, processing proceeds to step S2005.

In the processing of step S2005, because the display 22 is already operating, processing proceeds to step S2006. In the processing of step S2006, the video camera 21 transmits one frame of image data to the display 22. Thereafter, the video camera 21 repeats in sequence execution of the processing of step S2003, step S2005, and step S2006.

(Display 22 Processing)

Immediately after its own device power supply is turned on, the display 22 sequentially performs the processing of step S2101 and then step S2102 shown in FIG. 16, and reads in the device identification information and the communication status information that had been stored in the storage unit 52 immediately before the last time the power supply of its device was turned off. Next, in the processing of step S2103, an information updating request signal is transmitted to the controller 31, and a query is made as to whether or not there is updating of the device identification information and the communication status information. If there is updating of the device identification information and the communication status information, by the processing of step S2104, the updated device identification information and the communication status information transmitted from the controller 31 are received, the device identification information and the communication status information stored in the storage unit 52 being updated to the received device identification information and communication status information, and processing proceeding to step S2105. If, in the processing of step S2103, there had been no updating of the device identification information and the communication status information, or if the controller 31 is not operating and there was no response, processing proceeds to step S2105.

In the processing of step S2105, because the video camera 21 is already operating, processing proceeds to step S2106. In the processing of step S2106, the display 22 receives and causes display on the image display unit 19 of one frame of image data from the video camera 21. Therefore, the display 22 repeats in sequence execution of the processing of step S2103, step S2105, and step S2106.

(Controller 31 Processing)

Immediately after the power supply is applied, the controller 31 sequentially performs the processing of step S2201 and then step S2202 shown in FIG. 13, and reads in the identification information control table and the communication status control table that had been stored in the storage unit 38 immediately before the last time the power supply was turned off. Next, in the processing of step S2203, the video camera 21 and the display 22 are explored, the device identification information of the video camera 21 being established as C1, the device identification information of the display 22 being established as D1, and the identification information control table and the communication status control table stored in the storage unit 38 being updated. At this point in time, the device identification information of the video camera 21 and the display 22 are established, and the display content of the identification information display screen shown in FIG. 11 is established.

In the processing of step S2204, the control unit 33 of the controller 31 judges whether or not the operation instruction unit 32 has accepted input of a connection change. In this specific example, because the operation instruction unit 32 has not accepted input of a connection change, processing proceeds to step S2206. In the processing of step S2206, a judgment is made of whether or not an information updating request signal has been received from the video camera 21 and the display 22. If an information updating request signal has been received, processing proceeds to step S2207, and if an information updating request signal has not been received, processing proceeds to step S2203.

In the processing of step S2207, controller 31 transmits to the video camera 21 and the display 22 that are the transmission sources of the information updating signal the result of a judgment of whether or not the device identification information and the communication status information were updated after the last time the device identification information and the communication status information were transmitted. If the device identification information and the communication status information has been updated after the last time the device identification information and the communication status information were transmitted, the controller 31 transmits the updated device identification information and communication status information to the video camera 21 and the display 22. At this point in time, the video camera 21 and the display 22 cause the display of the received device identification information on the identification information display device 25, 27. The display 22 causes display of the received device identification information on the communication status display device 26. Thereafter, the controller 31 repeats in sequence execution of the processing of step S2203, step S2204, step S2206, and step S2207.

Specific Example 2 of Second Preferred Embodiment

Video Camera 21, 23 Processing

The processing of video cameras 21 and 23 is the same processing as that of the video camera 21 in Specific Example 1.

(Display 22, 24 Processing)

The processing of displays 22 and 24 is the same processing as that of the display 22 in Specific Example 1.

(Controller 31 Processing)

Immediately after the power supply is applied, the controller 31 sequentially performs the processing of step S2201 and then step S2202 shown in FIG. 13, and reads in the identification information control table and the communication status control table that had been stored in the storage unit 38 immediately before the last time the power supply was turned off. Next, in the processing of S2203, the video cameras 21 and 23 and the displays 22 and 24 are explored, the device identification information of the video camera 21 being established as C1, the device identification information of the video camera 23 being established as C2, the device identification information of the display 22 being established as D1, the device identification information of the display 24 being established as D2, and the identification information control table and the communication status control table stored in the storage unit 38 being updated. At this point in time, the device identification information of the video cameras 21 and 23 and the displays 22 and 24 are established, and the display content of the identification information display screen shown in FIG. 11 is established.

In the processing of step S2204, the control unit 33 of the controller 31 judges whether or not the operation instruction unit 32 has accepted input of a connection change. In this specific example, because the user inputs a connection change to the operation instruction unit 32 of the controller 31, the communication destination of the video camera 21 being switched to the display 24 and the communication destination of the video camera 23 being switched to the display 22, processing proceeds to step S2205. In the processing of step S2205, the control unit 33 of the controller 31, based on the input of the connection change received by the operation instruction unit 32, updates the identification information control table and the communication status control table stored in the storage unit 38. At this point in time, the connection relationship is established so that the communication destination of the video camera 21 (device identification information C1) is the display 24 (device identification information D2), and the communication destination of the video camera 23 (device identification information C2) is the display 22 (device identification information D1), the content displayed on the connection information display screen being as shown in FIG. 12(2).

In the processing of step S2206, a judgment is made of whether or not an information updating request signal has been received from the video cameras 21, 23 and display 22, 24. If an information updating request signal had been received, processing proceeds to step S2207, and if an information updating request signal had not been received, processing returns to step S2203.

In the processing of step S2207, the controller 31 transmits to the video camera 21, and 23 and display 22 and 24 that are the transmission sources of the information updating signal the result of a judgment of whether or not the device identification information and the communication status information has been updated after the last time the device identification information and the communication status information were transmitted. Because the device identification information and the communication status information had not been updated after the last time the device identification information and the communication status information were transmitted, the controller 31 transmits the updated device identification information and communication status information to the video camera 21, 23 and the display 22, 24. At this point in time, the video camera 21, 23 and the display 22, 24 cause display of the received device identification information on the identification information display devices 25, 27, 28, and 30. The display 22, 24 cause display of the received communication status information on the communication status display devices 26 and 29. Thereafter, the controller 31 repeats in sequence execution of the processing step S2203, step S2204, step S2206, and step S2207.

As described above, according to the second preferred embodiment, the video camera 21, 23 and the display 22, 24 cause display of device identification information that uniquely identifies their devices on the identification information display devices 25, 27, 28, and 30. The display 22, 24 cause display of communication status information that indicates device identification information and communication information of the communication destination devices of their devices on the communication status display devices 26 and 29. By doing this, because the device identification information and the communication status information are displayed in a visual manner, it is easy to grasp the operating status and connection relationship of each device.

Also, according to the second preferred embodiment, because the communication system 200 includes the controller 31, the flow of image data between the video cameras 21 and 23 and the displays 22 and 24 can be switched. By doing this, the communication system 200 has increased flexibility and convenience as a wireless communication system. Also, because the device identification information that uniquely identifies the video cameras 21 and 23 and the displays 22 and 24 included in the communication system 200 is displayed on the display unit 35 of the controller 31, the user can quickly view the devices that are actually included in the communication system 200.

Also, the second preferred embodiment has been described for an example in which the video cameras 21 and 23, the displays 22 and 24 are connected with the identification information display devices 25, 27, 28, and 30. Although this is to enhance the recognition of the device identification information of each of the devices, depending upon the condition of the communication system 200, the identification information display devices 25, 27, 28, and 30 may be connected to only a part of the devices, and the device identification information of each device may be made to be displayed on the display unit 35 of the controller 31.

For example, a communication system may be constituted so that the identification information display devices 28 and 30 connected to the video camera 23 and the display 24 in the communication system 200 in FIG. 9 are eliminated, the device identification information of the video camera 23 and the display 24 being caused to be displayed on the display unit 35 of the controller 31, so that the device identification information of each device is verified on the display unit 25 of the controller 31.

Also, in the communication system 200 shown in FIG. 9, because it is not necessary to display identification information, such as in the case in which there exist video cameras and displays that are not illustrated and operate at all times with fixed connections, the identification information display devices need not be connected to these video cameras and displays.

Although the above has been a detailed description of the first and second preferred embodiments of the present invention, with references made to the drawings, the specific constitution is not restricted to these preferred embodiments, and encompasses design changes and the like within the scope of the spirit of the present invention.

The present invention can be applied to a display device, a receiving device, a transmitting device, and a wireless communication system, and facilitates an understanding of the wireless communication connection relationship.

According to the display device, the transmitting terminal, and the receiving terminal in accordance with a preferred embodiment of the present invention, an acquisition unit acquires transmitting terminal identification information that is identification information of a transmitting terminal transmitting image data by wireless communication, and receiving terminal identification information that is identification information of a receiving terminal receiving the image data by wireless communication. Also, an information display unit displays the transmitting terminal identification information and the receiving terminal identification information. By doing this, because the transmitting terminal identification information of the transmitting terminal that transmits image data and the receiving terminal identification information of the receiving terminal that receives image data are displayed on the information display unit, it is easy to understand the wireless communication connection relationship.

According to the wireless communication system in accordance with a preferred embodiment of the present invention, the plurality of identification information display devices visually display the identification information established for each individual communication device. A communication status display device displays the flow of image data between the communication devices. Also, the identification information is uniquely established at the time the communication device joins the network. By doing this, the identification information of communication devices that transmit and receive image data is displayed on the identification information display device, and the flow of image data between communication devices is displayed on the communication status display device, thereby facilitating an understanding of the wireless communication connection relationship.

What is claimed is:

1. A wireless communication system, in which a terminal that wirelessly transmits image data is referred to as a transmitting terminal, a terminal that wirelessly receives image data is referred to as a receiving terminal, and a device that instructs to switch a wireless communication connection between the transmitting terminal and the receiving terminal is referred to as a connection switching device, the wireless communication system having a plurality of the transmitting terminals, a plurality of the receiving terminals, and at least one of the connection switching device, the wireless communication system comprising:

a first display device connected by cable to the transmitting terminal to display transmitting terminal identification information that is identification information of the transmitting terminal; and a second display device connected by cable to the receiving terminal to display receiving terminal identification information that is identification information of the receiving terminal, wherein the connection switching device displays the transmitting terminal identification information displayed on the first display device, the receiving terminal identification information displayed on the second display device, and information indicating that the image data is wirelessly transmitted from the transmitting terminal to the receiving terminal.

2. The wireless communication system according to claim 1, wherein the connection switching device wirelessly receives the transmitting terminal identification information from the transmitting terminal and the receiving terminal identification information from the receiving terminal, respectively.

3. The wireless communication system according to claim 1, further comprising:

a third display device that is connected by cable to the receiving terminal to display information indicating that the transmitting terminal identification information and the image data are wirelessly transmitted from the transmitting terminal corresponding to the transmitting terminal identification information.

4. The wireless communication system according to claim 3, further comprising:

a fourth display device that is connected by cable to the transmitting terminal to display information indicating that the receiving terminal identification information and the image data are wirelessly transmitted to the receiving terminal corresponding to the receiving terminal identification information.

5. The wireless communication system according to claim 1, further comprising:

a fourth display device that is connected by cable to the transmitting terminal to display information indicating that the receiving terminal identification information and the image data are wirelessly transmitted to the receiving terminal corresponding to the receiving terminal identification information.

6. The wireless communication system according to claim 1, wherein the receiving terminal has an image data display unit that displays the image data.

* * * * *